(12) United States Patent
Abe et al.

(10) Patent No.: US 11,340,974 B2
(45) Date of Patent: May 24, 2022

(54) STORAGE CONTROL DEVICE AND NON-TRANSITORY COMPUTER-READABLE STORAGE MEDIUM FOR STORING STORAGE CONTROL PROGRAM

(71) Applicant: FUJITSU LIMITED, Kawasaki (JP)

(72) Inventors: Keima Abe, Kawasaki (JP); Motohiro Sakai, Nerima (JP); Takuro Kumabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 197 days.

(21) Appl. No.: 16/891,137

(22) Filed: Jun. 3, 2020

(65) Prior Publication Data

US 2020/0409778 A1 Dec. 31, 2020

(30) Foreign Application Priority Data

Jun. 28, 2019 (JP) .............................. JP2019-121662

(51) Int. Cl.
| | |
|---|---|
| *G06F 11/00* | (2006.01) |
| *G06F 11/07* | (2006.01) |
| *G06F 12/0817* | (2016.01) |
| *G06F 12/0895* | (2016.01) |
| *G06F 11/30* | (2006.01) |

(52) U.S. Cl.
CPC ........ *G06F 11/073* (2013.01); *G06F 11/0772* (2013.01); *G06F 11/3037* (2013.01); *G06F 12/0822* (2013.01); *G06F 12/0895* (2013.01)

(58) Field of Classification Search
None
See application file for complete search history.

(56) References Cited

U.S. PATENT DOCUMENTS

| | | | |
|---|---|---|---|
| 2006/0069870 A1* | 3/2006 | Nicholson | .................. G06F 1/30 |
| | | | 711/E12.04 |
| 2008/0189484 A1 | 8/2008 | Iida et al. | |
| 2008/0276040 A1* | 11/2008 | Moritoki | ............. G06F 12/0804 |
| | | | 711/E12.019 |

(Continued)

FOREIGN PATENT DOCUMENTS

| | | |
|---|---|---|
| JP | 2008-192028 A | 8/2008 |
| JP | 2016-051387 A | 4/2016 |
| JP | 2018-128939 A | 8/2018 |

OTHER PUBLICATIONS

Google Scholar/Patents—text refined (Year: 2021).*

*Primary Examiner* — Christopher S McCarthy
(74) *Attorney, Agent, or Firm* — Fujitsu Patent Center

(57) ABSTRACT

A storage control device includes: an auxiliary cache memory that is a nonvolatile memory; a volatile memory; and a processor configured to execute a saving control process after a predetermined failure occurs, the saving control process being configured to (a) cause a writing control process to stop writing of data stored in the auxiliary cache memory to the storage medium, (b) secure, in the auxiliary cache memory, a storage region for storing the management information of the volatile memory, (c) generate a copy of management information of the volatile memory in the storage region, and (d) cause the writing control process to execute control to write first data stored in the volatile memory to the auxiliary cache memory or the storage medium based on the management information of the auxiliary cache memory.

8 Claims, 19 Drawing Sheets

(56) References Cited

U.S. PATENT DOCUMENTS

| | | |
|---|---|---|
| 2016/0062915 A1 | 3/2016 | Matsumura et al. |
| 2017/0091054 A1* | 3/2017 | Delaney .............. G06F 11/1092 |
| 2018/0232307 A1 | 8/2018 | Oota |
| 2018/0329818 A1* | 11/2018 | Cheng ................. G06F 11/1438 |
| 2022/0019502 A1* | 1/2022 | Mylavarapu ........ G06F 11/1068 |

* cited by examiner

| | #0 | #1 | #2 | #3 | #4 | #5 | #6 | ... |
|---|---|---|---|---|---|---|---|---|
| LOGICAL VOLUME LBA OFFSET | 2 | 5 | 2 | 5 | - | - | - | ... |
| LOGICAL VOLUME NUMBER | V0 | V0 | V1 | V1 | - | - | - | ... |
| AUXILIARY CACHE LBA OFFSET | 0 | 1 | 2 | 3 | 4 | 5 | 6 | ... |
| AUXILIARY CACHE NUMBER | C0 | C0 | C0 | C0 | C0 | C0 | C0 | ... |
| DIRTY FLAG | OFF | ON | OFF | ON | OFF | OFF | OFF | ... |

| | #0 | #1 | #2 | #3 | #4 | #5 | #6 | |
|---|---|---|---|---|---|---|---|---|
| LOGICAL VOLUME LBA OFFSET | 2 | 5 | 2 | 5 | - | - | - | ... |
| LOGICAL VOLUME NUMBER | V0 | V0 | V1 | V1 | - | - | - | ... |
| AUXILIARY CACHE LBA OFFSET | 0 | 1 | 2 | 3 | 4 | 5 | 6 | ... |
| AUXILIARY CACHE NUMBER | C0 | C0 | C0 | C0 | C0 | C0 | C0 | ... |
| DIRTY FLAG | OFF | ON | OFF | ON | OFF | OFF | OFF | ... |

| | #0 | #1 | #2 | #3 | #4 | #5 | #6 | ... |
|---|---|---|---|---|---|---|---|---|
| LOGICAL VOLUME LBA OFFSET | 2 | - | - | - | - | - | - | ... |
| LOGICAL VOLUME NUMBER | 0 | - | - | - | - | - | - | ... |
| AUXILIARY CACHE LBA OFFSET | 0 | 1 | 2 | 3 | 4 | 5 | 6 | ... |
| AUXILIARY CACHE NUMBER | 0 | 0 | 0 | 0 | 0 | 0 | 0 | ... |
| DIRTY FLAG | ON (312) | OFF | OFF | OFF | OFF | OFF | OFF | ... |

| | #0 | #1 | #2 | #3 | #4 | #5 | #6 | ... |
|---|---|---|---|---|---|---|---|---|
| LOGICAL VOLUME LBA OFFSET | 1 | 2 | - | 4 | 5 | - | - | ... |
| LOGICAL VOLUME NUMBER | 0 | 0 | - | 0 | 0 | - | - | ... |
| AUXILIARY CACHE LBA OFFSET | 0 | 1 | 2 | 3 | 4 | 5 | 6 | ... |
| AUXILIARY CACHE NUMBER | 0 | 0 | 0 | 0 | 0 | 0 | 0 | ... |
| DIRTY FLAG | OFF | ON | OFF | OFF | ON | OFF | OFF | ... |

315

| | #0 | #1 | #2 | #3 | #4 | #5 | #6 | ... |
|---|---|---|---|---|---|---|---|---|
| LOGICAL VOLUME LBA OFFSET | 1 | 2 | - | 4 | 5 | - | - | ... |
| LOGICAL VOLUME NUMBER | 0 | 0 | - | 0 | 0 | - | - | ... |
| AUXILIARY CACHE LBA OFFSET | 0 | 1 | 2 | 3 | 4 | 5 | 6 | ... |
| AUXILIARY CACHE NUMBER | 0 | 0 | 0 | 0 | 0 | 0 | 0 | ... |
| DIRTY FLAG | OFF | ON | OFF | OFF | ON | OFF | OFF | ... |

| | #0 | #1 | #2 | #3 | #4 | #5 | #6 | ... |
|---|---|---|---|---|---|---|---|---|
| LOGICAL VOLUME LBA OFFSET | - | 2 | - | - | 5 | - | - | ... |
| LOGICAL VOLUME NUMBER | - | 0 | - | - | 0 | - | - | ... |
| AUXILIARY CACHE LBA OFFSET | 0 | 1 | 2 | 3 | 4 | 5 | 6 | ... |
| AUXILIARY CACHE NUMBER | C0 | C0 | C0 | C0 | C0 | C0 | C0 | ... |
| DIRTY FLAG | OFF | ON | OFF | OFF | ON | OFF | OFF | ... |

317

| | #0 | #1 | #2 | #3 | #4 | #5 | #6 | ... |
|---|---|---|---|---|---|---|---|---|
| LOGICAL VOLUME LBA OFFSET | 1 | 2 | - | 4 | 5 | - | - | ... |
| LOGICAL VOLUME NUMBER | V0 | V0 | - | V0 | V0 | - | - | ... |
| AUXILIARY CACHE LBA OFFSET | 0 | 1 | 2 | 3 | 4 | 5 | 6 | ... |
| AUXILIARY CACHE NUMBER | C0 | C0 | C0 | C0 | C0 | C0 | C0 | ... |
| DIRTY FLAG | OFF | ON | OFF | OFF | ON | OFF | OFF | ... |

| | #0 | #1 | #2 | #3 | #4 | #5 | #6 | ... |
|---|---|---|---|---|---|---|---|---|
| LOGICAL VOLUME LBA OFFSET | - | 2 | - | - | 5 | - | - | ... |
| LOGICAL VOLUME NUMBER | - | 0 | - | - | 0 | - | - | ... |
| AUXILIARY CACHE LBA OFFSET | 0 | 1 | 2 | 3 | 4 | 5 | 6 | ... |
| AUXILIARY CACHE NUMBER | 0 | 0 | 0 | 0 | 0 | 0 | 0 | ... |
| DIRTY FLAG | OFF | ON | OFF | OFF | ON | OFF | OFF | ... |

324 → #1 column (2, 0); 325 → #4 column (5, 0)

323

| | #0 | #1 | #2 | #3 | #4 | #5 | #6 | ... |
|---|---|---|---|---|---|---|---|---|
| LOGICAL VOLUME LBA OFFSET | 1 | 2 | - | 4 | 5 | - | - | ... |
| LOGICAL VOLUME NUMBER | 0 | 0 | - | 0 | 0 | - | - | ... |
| AUXILIARY CACHE LBA OFFSET | 0 | 1 | 2 | 3 | 4 | 5 | 6 | ... |
| AUXILIARY CACHE NUMBER | 0 | 0 | 0 | 0 | 0 | 0 | 0 | ... |
| DIRTY FLAG | OFF | ON | OFF | OFF | ON | OFF | OFF | ... |

STORAGE CONTROL DEVICE AND NON-TRANSITORY COMPUTER-READABLE STORAGE MEDIUM FOR STORING STORAGE CONTROL PROGRAM

CROSS-REFERENCE TO RELATED APPLICATION

This application is based upon and claims the benefit of priority of the prior Japanese Patent Application No. 2019-121662, filed on Jun. 28, 2019, the entire contents of which are incorporated herein by reference.

FIELD

The present invention is related to a storage control device and a non-transitory computer-readable storage medium for storing a storage control program.

BACKGROUND

It is common that many disks constituting a group of Redundant Arrays of Inexpensive Disks (RAIDS) are installed in a storage device. A major factor that hinders high-speed performance in the storage device is a processing delay caused by access to a disk.

For example, when caching fails for a read command, a staging process of loading data from the disk to a dynamic random-access memory (DRAM) that is a main storage device is executed and thus a time period for processing for access to the disk causes a delay.

In this case, a cache hit ratio may be improved by significantly increasing the capacity of the DRAM. The DRAM, however, is a nonvolatile memory. When the DRAM is increased in capacity, a large-capacity battery is installed in consideration of a power outage, and it is difficult to respond to a request for downsizing or the like. The DRAM is more expensive than the disk and it is not easy to significantly increase the capacity of the DRAM from the viewpoint of the cost. Instead of this, it is considered that a higher-speed solid state drive (SSD) than the disk is used. However, an improvement in the speed of access to the disk is not expected for a logical drive that does not belong to a RAID group constituted by SSDs.

To reduce a delay in the access to the disk, a technique for improving the performance of an entire storage device using a flash memory such as an SSD as an auxiliary cache memory that is a secondary cache memory has been proposed. The auxiliary cache memory is, for example, installed in a controller module configured to control the disk and installed in the storage device.

When the auxiliary cache memory is used as a read cache, data that is likely to be used is loaded from the disk into the auxiliary cache memory in advance. Then, when caching to the DRAM fails for a read command, data is loaded from the auxiliary cache memory into the DRAM. Therefore, the speed of processing for reading is improved, compared to the case where the data is read from the disk.

The auxiliary cache memory is used also to improve a response to a writing process in some cases. For example, when a large number of dirty data items that are not written to the disk and whose updates are not reflected in data existing on the disk exist on the DRAM and wait to be written back, and it is difficult to secure a cache region of the DRAM, the write-back is executed on the high-speed accessible auxiliary cache memory. After that, the data items written to the auxiliary cache memory are asynchronously written back to the disk. Therefore, the cache region of the DRAM has an available region and processing performance for the writing is improved.

When the auxiliary cache memory is used, data positions on a volume that is a logical storage region to be recognized by a host are associated with data positions on the auxiliary cache memory according to an auxiliary cache management table to be used to manage cache pages of the auxiliary cache memory. The auxiliary cache management table is referenced every time data is accessed. Therefore, the auxiliary cache management table is preferably referenced at a high speed and is located on the DRAM. In the auxiliary cache management table, logical and physical conversion information that is information of association relationships between data positions on the volume and data positions on the auxiliary cache memory, and information indicating whether dirty data is present on the auxiliary cache memory are registered.

A process of writing data to the storage device has two modes, a write-back mode and a write-through mode. The write-back mode is a mode in which, when data is written to a cache, a response indicating the completion of the writing is given to the host. The write-through mode is a mode in which, when data is written to a disk that is a final storage medium, a response indicating the completion of the writing is given to the host.

In a normal state, the storage device operates in the write-back mode in which input and output (I/O) performance is high. When a reliability availability serviceability (RAS) event that may impair the safety of data existing on the DRAM that is a volatile memory occurs, the storage device switches the mode to protect the data. For example, the storage device transitions to the write-through mode that may maintain a state in which dirty data does not exist on the cache. Examples of the RAS event are a battery abnormality, the replacement of firmware, and the like.

When a failure that causes the MS event occurs, the storage device operates in the write-back mode and is in a state in which dirty data exists on the cache. After the storage device completes the write-back of all dirty data existing when the failure that causes the RAS event occurs, the storage device transitions to the write-through mode.

Normally, it is important to reduce a time period from the occurrence of the failure causing the RAS event to the transition to the write-through mode from the viewpoint of data protection. For example, when a battery abnormality occurs in a state in which dirty data exists, and a power outage occurs before the completion of write-back of dirty data after the occurrence of the battery abnormality, the DRAM is a volatile memory and thus the dirty data may be lost in the storage device. During the transition from the write-back mode to the write-through mode, the storage device operates in the write-through mode for I/O received from the host after the occurrence of the RAS event and sequentially writes dirty data of I/O received before the occurrence of the RAS event back to the disk.

Although the auxiliary cache memory is a nonvolatile memory, the auxiliary cache management table in which the data positions on the volume are associated with the data positions on the auxiliary cache memory exists on the DRAM. When the auxiliary cache management table is lost, it is difficult to access data existing on the auxiliary cache. It is, therefore, desirable that dirty data existing on the auxiliary cache be written back to the disk that is the final storage medium at the time of the transition to the write-through mode.

As a technique for managing the cache in the storage device, there is an existing technique for improving the performance of data access by storing, on the auxiliary cache memory, data in a range specified by an operator. There is an existing technique for managing data using a threshold so that the amount of dirty data in a volatile memory does not exceed the capacity of a nonvolatile memory when the capacity of the volatile memory is larger than the capacity of the nonvolatile memory for backup in case of a power outage. There is an existing technique for collectively executing backup for a power outage process and executing a process of writing information based on another abnormality when the other abnormality occurs during the execution of the power outage process.

Examples of the related art are Japanese Laid-open Patent Publication No. 2016-51387, Japanese Laid-open Patent Publication No. 2008-192028, and Japanese Laid-open Patent Publication No. 2018-128939.

SUMMARY

According to an aspect of the embodiments, a storage control device includes: an auxiliary cache memory that is a nonvolatile memory; a volatile memory; and a processor configured to: execute a writing control process that including receiving a first command to write first data to a storage medium with a lower processing speed than the auxiliary cache memory and a larger capacity than the auxiliary cache memory, writing the first data to the volatile memory, transmitting a response indicating the completion of the writing, writing the first data stored in the volatile memory to the auxiliary cache memory after the transmission of the response, and writing the first data stored in the auxiliary cache memory to the storage medium; execute an information management process that includes storing management information in the volatile memory, the management information including state information indicating storage states of data in the auxiliary cache memory and in the storage medium; and execute a saving control process after a predetermined failure occurs, the saving control process being configured to cause the writing control process to stop control of writing the data stored in the auxiliary cache memory to the storage medium, secure, in the auxiliary cache memory, a storage region for storing the management information of the volatile memory, generate a copy of the management information of the volatile memory in the storage region, and cause the writing control process to execute control to write the first data stored in the volatile memory to the auxiliary cache memory or the storage medium based on the management information of the auxiliary cache memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of the auxiliary cache management table in the data reading;

FIG. 9 is a diagram illustrating an example of the auxiliary cache management table in the data writing in the normal state;

FIG. 11 is a diagram illustrating an example of the auxiliary cache management table when the failure occurs;

FIG. 13 is a diagram illustrating an example of the auxiliary cache management table in the case where the process of writing the data when the failure occurs is executed;

FIG. 15 is a diagram illustrating an example of the auxiliary cache management table when the process is executed at the time of the power restoration in the case where the power outage occurs after the occurrence of the failure;

DESCRIPTION OF EMBODIMENT(S)

The auxiliary cache memory, however, has a larger capacity than the DRAM. Therefore, it takes time to write dirty data back to the disk from the auxiliary cache memory, compared to the write-back of the dirty data to the disk from the DRAM. For example, the auxiliary cache memory may secure up to 12.8 TB per controller module installed in the storage device for controlling reading and writing of data from and to the disk, while the cache of the DRAM secures up to 256 GB per controller module installed in the storage device for controlling reading and writing of data from and to the disk. When simple calculation is executed in such a configuration treating the capacity as a standard, the write-back from the auxiliary cache memory to the disk takes approximately 51 times as long as the write-back from the DRAM to the disk. It may take a minute or more to execute a write-through transition process from the DRAM to the disk in a high-load I/O environment. A time period for write-back from the auxiliary cache to the disk is significantly longer than the foregoing and exceeds an allowable range, and it is difficult to secure sufficient reliability.

Techniques disclosed herein have been devised under the foregoing circumstances and aim to provide a storage control device and a storage control program that improve the reliability of a storage device.

According to one aspect, the present invention may improve the reliability of a storage device.

Hereinafter, an embodiment of a storage control device disclosed herein and a storage control program disclosed herein is described in detail based on the drawings. The storage control device disclosed herein and the storage control program disclosed herein are not limited by the following embodiment.

Embodiment

Figure 1:
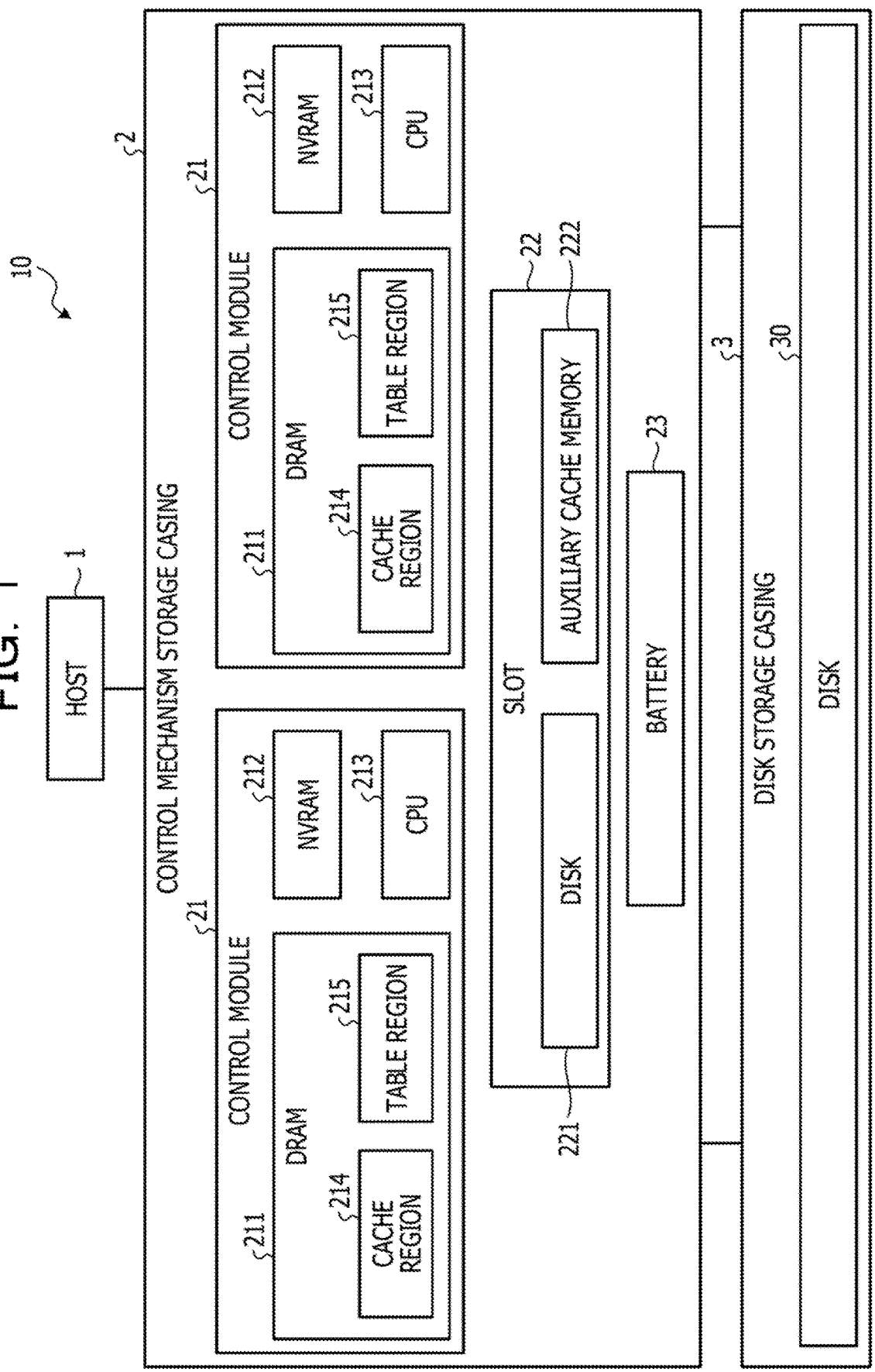
FIG. 1 is a diagram illustrating an example of a hardware configuration of a storage device.

FIG. 1 is a diagram illustrating an example of a hardware configuration of a storage device. A storage device 10 according to the embodiment is coupled to a host 1 that is a server or the like and outputs a command to write data and a command to read data. The storage device 10 includes a control mechanism storage casing 2 and a disk storage casing 3. The control mechanism storage casing 2 and the disk storage casing 3 are coupled to each other via Serial Attached Small Computer System Interfaces (SASS).

The control mechanism storage casing 2 includes control modules 21, a slot 22, and a battery 23. In the control mechanism storage casing 2 illustrated in FIG. 1, two control modules 21 are installed, but the number of control modules 21 is not limited to this.

Each of the control modules 21 includes a DRAM 211, a nonvolatile random-access memory (NVRAM) 212, and a central processing unit (CPU) 213. The CPU 213 controls data writing and data reading.

The DRAM 211 is a volatile memory. The DRAM 211 is logically divided into a cache region 214 and a table region 215. The cache region 214 is a region for temporarily storing data to be used for the write command output from the host 1 and the read command output from the host 1. The command, output from the host 1, to write the data and the command, output from the host 1, to read the data are hereinafter referred to disk I/O in some cases. The table region 215 is a region for storing a control table.

The NVRAM 212 is a nonvolatile memory. When a power outage occurs, the NVRAM 212 is used as an emergent storage location for data stored in the cache region 214 and the table region 215 that have used the battery 23.

The slot 22 may store a disk 221 and an auxiliary cache memory 222. The disk 221 is an auxiliary storage medium that is a hard disk or the like. The auxiliary cache memory 222 is a location for temporarily storing data in data writing and data reading for the disk I/O. The auxiliary cache memory 222 is, for example, an SSD. The control mechanism storage casing 2 that includes the control modules 21 and the auxiliary cache memory 222 is an example of a "storage control device".

The battery 23 operates as an auxiliary power source when the supply of power to the storage device 10 is stopped due to a power outage or the like. The control modules 21, the disk 221 installed in the slot 22, and the auxiliary cache memory 222 installed in the slot 22 may operate with power supplied from the battery 23.

The disk storage casing 3 includes a disk slot and stores a disk 30. The disk 221 and the disk 30 have the same functions and are hereinafter collectively described as disks 30. The disks 30 are, for example, hard disks. Processing speeds of the disks 30 are lower than that of the auxiliary cache memory 222, while capacities of the disks 30 are larger than that of the auxiliary cache memory 222. Each of the disks 30 is an example of a "storage unit".

Figure 2:
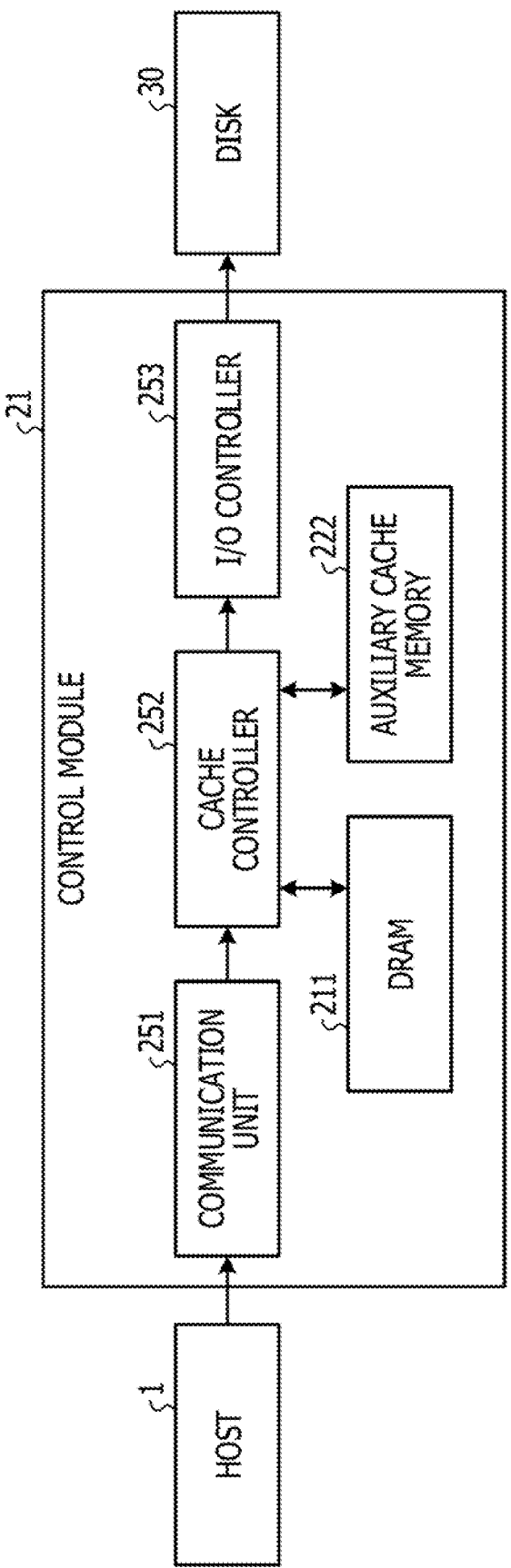
FIG. 2 is a block diagram illustrating an overview of functions of a control module according to an embodiment.

FIG. 2 is a block diagram illustrating an overview of functions of each of the control modules according to the embodiment. As illustrated in FIG. 2, the control module 21 includes a communication unit 251, a cache controller 252, and an I/O controller 253.

The communication unit 251 receives, from the host 1, a request to access the disk 30 and outputs the request to the cache controller 252. After that, the communication unit 251 receives a response to the access request from the cache controller 252 and transmits the response to the host 1.

Figure 3:
FIG. 3 is a diagram illustrating an example of an auxiliary cache management table.

The cache controller 252 is coupled to the DRAM 211 and the auxiliary cache memory 222. The cache controller 252 uses the auxiliary cache management table 300, illustrated in FIG. 3, for managing data stored in the DRAM 211 to control reading and writing of data from and to the DRAM 211 and the auxiliary cache memory 222. FIG. 3 is a diagram illustrating an example of the auxiliary cache management table. The auxiliary cache management table 300 is an example of "management information". The auxiliary cache management table 300 is described below.

The auxiliary cache management table 300 is a table for managing addresses of the auxiliary cache memory 222 in units of predetermined logical block addresses (LBAs). Each of the LBAs has a size of 0x800 in the embodiment. The auxiliary cache management table 300 is stored in the table region 215 of the DRAM 211.

The auxiliary cache management table 300 has a plurality of elements including elements #1 to #6 illustrated in FIG. 3. As illustrated in FIG. 3, in each of the elements #1 to #6 of the table, a logical volume LBA offset, a logical volume number, an auxiliary cache LBA offset, an auxiliary cache number, and a dirty flag are registered. The logical volume LBA offset is an offset per 0x800 LBA unit of an LBA of a logical volume managed by the concerned element of the auxiliary cache management table 300. The logical volume number is a number of a logical volume specified by disk I/O. The auxiliary cache LBA offset is an offset per 0x800 LBA unit of an LBA of the auxiliary cache memory 222 managed by the concerned element of the auxiliary cache management table 300. When a plurality of auxiliary cache memories 222 exist, auxiliary cache numbers are identification numbers, each of which identifies a respective one of the auxiliary cache memories 222. The dirty flag is a flag indicating whether dirty data exists in a 0x800 region of the auxiliary cache memory 222 managed by the concerned element. The dirty data exists on the auxiliary cache memory 222 but is not yet stored in the disk 30. The dirty flag is an example of "state information".

Figure 4:
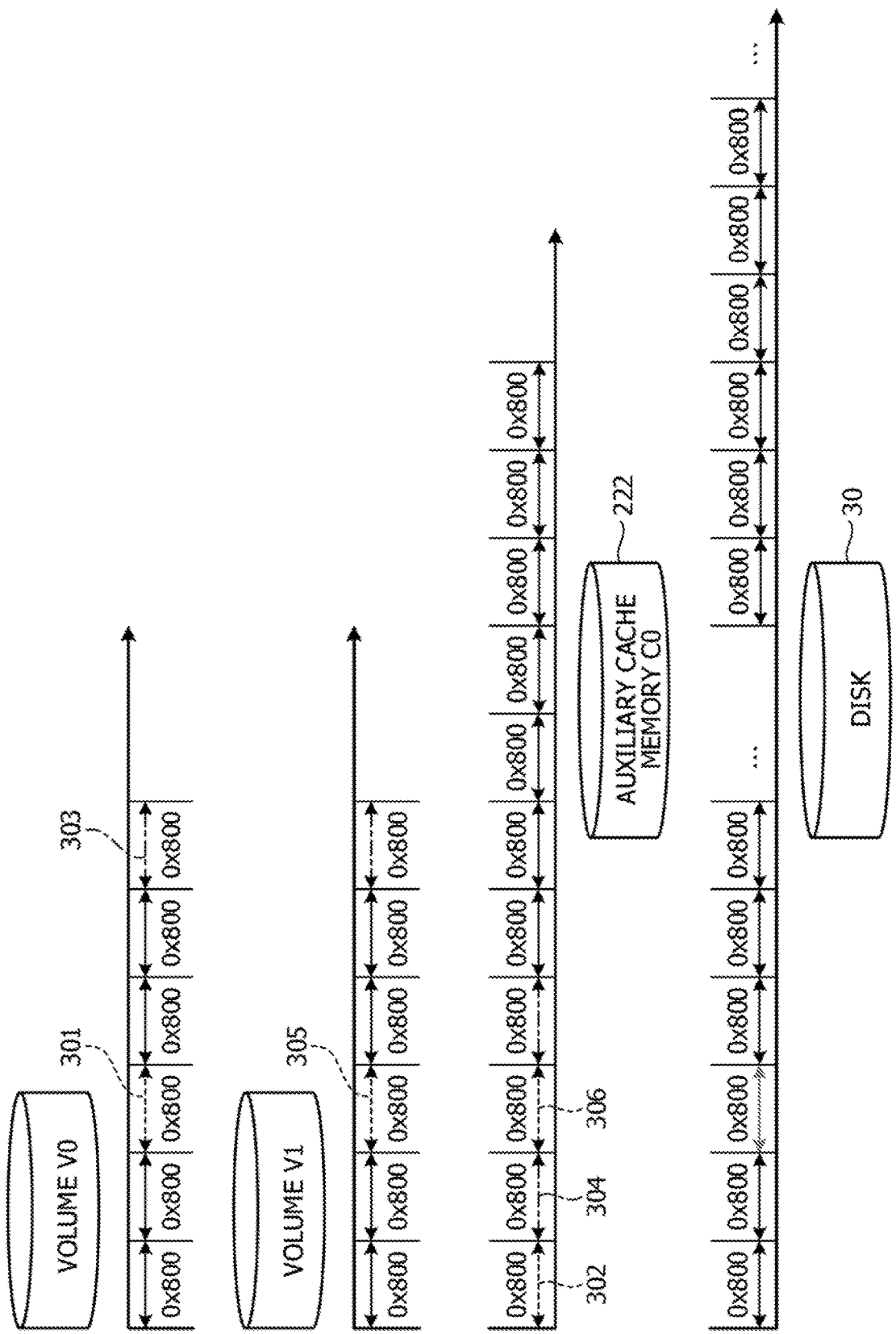
FIG. 4 is a diagram illustrating relationships between the auxiliary cache management table and storage states of actual data.

Next, relationships between the auxiliary cache management table 300 and storage states of actual data are described with reference to FIG. 4. FIG. 4 is a diagram illustrating the relationships between the auxiliary cache management table and the storage states of the actual data. In FIG. 4, solid arrows indicate regions in which data does not exist on the auxiliary cache memory 222 and in which the latest data exists on the disk 30. Dotted arrows indicate regions in which data existing on the auxiliary cache memory 222 matches data existing on the disk 30. Chain arrows indicate regions in which dirty data exists on the auxiliary cache memory 222. Gray arrows indicate unused regions. The auxiliary cache management table 300 that is illustrated in FIG. 4 and in which the information illustrated in FIG. 3 is registered is described below.

The element #0 of the auxiliary cache management table 300 indicates information of data in a region 301 of a logical volume LBA offset 2 of a volume V0 having a logical volume number V0. The data registered in the element #0 exists in a region 302 of an auxiliary cache LBA offset 0 in an auxiliary cache memory C0 that is an auxiliary cache memory 222 and has an auxiliary cache number C0. The data registered in the element #0 exists on the disk 30 since a dirty flag of the element #0 indicates OFF.

For example, the element #1 of the auxiliary cache management table 300 indicates information of data in a region 303 of a logical volume LBA offset 5 of the volume V0. The data registered in the element #1 exists in a region 304 of an auxiliary cache LBA offset 1 in the auxiliary cache memory C0. The data registered in the element #1 does not exist on the disk 30 since a dirty flag of the element #1 indicates ON.

For example, the element #2 of the auxiliary cache management table 300 indicates information of data in a region 305 of a logical volume LBA offset 2 of a volume V1 having a logical volume number V1. The data registered in the element #2 exists in a region 306 of an auxiliary cache LBA offset 2 in the auxiliary cache memory C0. The data registered in the element #2 exists on the disk 30 since a dirty flag of the element #2 indicates OFF.

Return to FIG. 2 to continue the description. The cache controller 252 updates and manages the auxiliary cache management table 300 stored on the DRAM 211 and the auxiliary cache memory 222. Details of functions of the cache controller 252 are described later.

The I/O controller 253 executes an I/O process of reading and writing data from and to the disks 30 including the disk 221.

Figure 5:
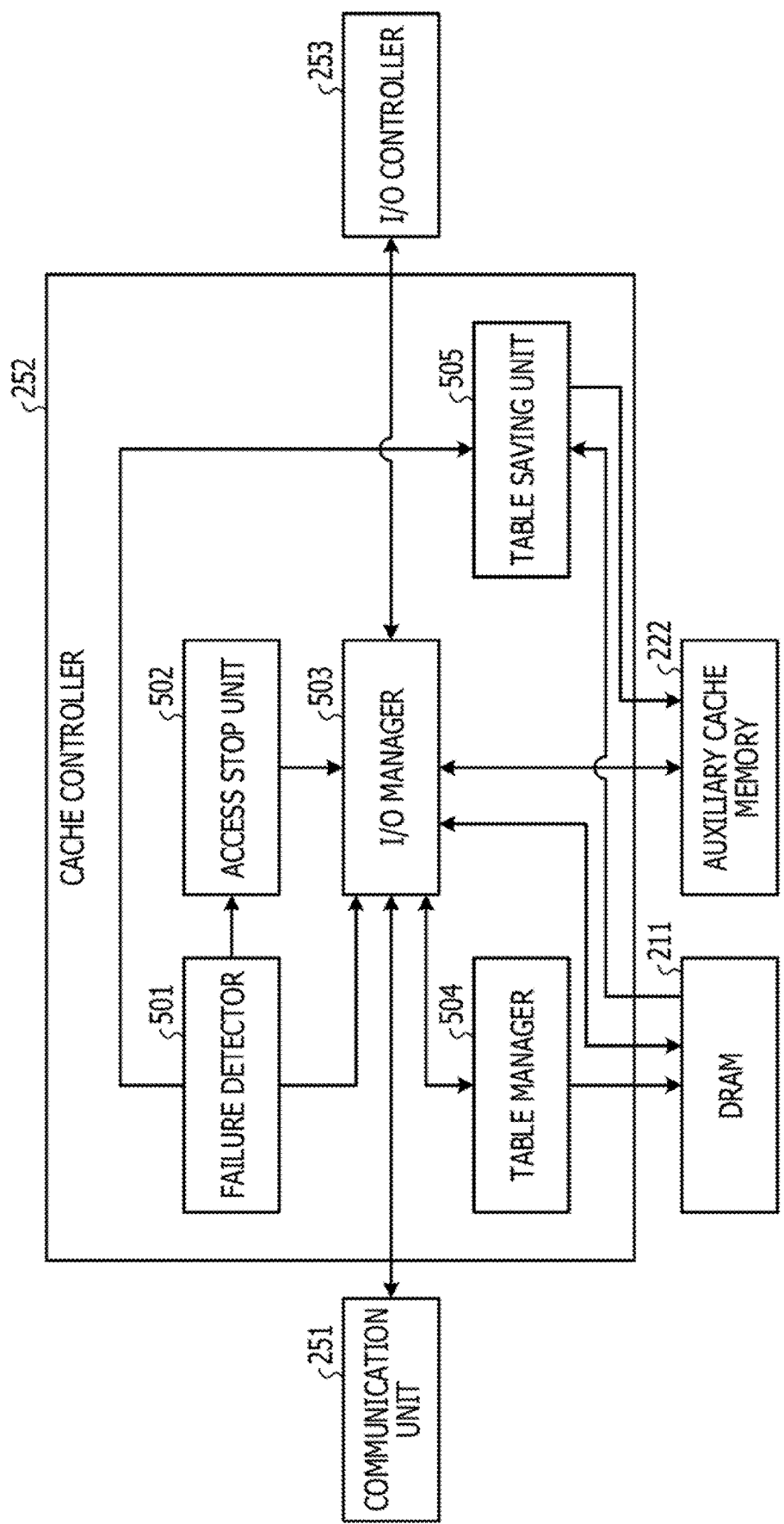
FIG. 5 is a block diagram illustrating details of a cache controller.

Next, the functions of the cache controller 252 are described in detail with reference to FIG. 5. FIG. 5 is a block diagram illustrating details of the cache controller. As illustrated in FIG. 3, the cache controller 252 includes a failure detector 501, an access stop unit 502, an I/O manager 503, a table manager 504, and a table saving unit 505.

The failure detector 501 detects the occurrence of a failure that causes an RAS event that may impair the safety of data existing on the DRAM 211 included in the storage device 10. Then, the failure detector 501 notifies the occurrence of the failure to the access stop unit 502, the I/O manager 503, and the table saving unit 505.

Upon receiving the notification indicating the occurrence of the failure from the failure detector 501, the access stop unit 502 causes the I/O manager 503 to stop data migration between the auxiliary cache memory 222 and the disk 30.

Upon receiving the notification indicating the occurrence of the failure from the failure detector 501, the table saving unit 505 secures a metadata region in a region other than a data cache region of the auxiliary cache memory 222. Then, the table saving unit 505 generates, in the secured metadata region, a copy of the auxiliary cache management table 300 on the DRAM 211. It may be said that this is saving in the auxiliary cache memory 222 of the auxiliary cache management table 300 on the DRAM 211 for the case where data existing on the DRAM 211 is lost. The table saving unit 505 is an example of a "saving controller".

The I/O manager 503 receives input of disk I/O from the communication unit 251. The I/O manager 503 writes and reads data to and from the disk 30 via the I/O controller 253 in fact. The I/O manager 503 is described below while a description of a process by the I/O controller 253 is omitted.

When the disk I/O is a command to read data, the I/O manager 503 determines whether data exists on the DRAM 211. When the data exists on the DRAM 211, the I/O manager 503 reads the data from the DRAM 211 and outputs the data to the communication unit 251. On the other hand, when the data does not exist on the DRAM 211, the I/O manager 503 uses the auxiliary cache management table 300 stored in the table region 215 of the DRAM 211 to determine whether the data exists on the auxiliary cache memory 222.

When the data exists, the I/O manager 503 reads the data from the auxiliary cache memory 222. Then, the I/O manager 503 causes the read data to be stored in the DRAM 211 and outputs the data to the communication unit 251.

On the other hand, when the data does not exist on the auxiliary cache memory 222, the I/O manager 503 causes the table manager 504 to update the auxiliary cache management table 300 illustrated in FIG. 4. After that, upon receiving a notification indicating the completion of the update from the table manager 504, the I/O manager 503 acquires the data read from the disk 30. Then, the I/O manager 503 causes the acquired data to be stored at a position on an auxiliary cache memory 222 identified by an auxiliary cache number registered in the auxiliary cache management table 300 and an auxiliary cache LBA offset registered in the auxiliary cache management table 300. The I/O manager 503 outputs the acquired data to the communication unit 251.

Next, operations of the I/O manager 503 when the disk I/O is a write command in a state in which a notification indicating the occurrence of a failure is not received from the failure detector 501 are described. Data instructed to be written when the disk I/O is the write command in the state in which the notification indicating the occurrence of the failure is not received is an example of "first data". In this case, the I/O manager 503 operates in the write-back mode. Upon receiving the data to be written, the I/O manager 503 writes the data to the DRAM 211 and transmits information indicating the completion of the writing to the communication unit 251.

After that, the I/O manager 503 references the auxiliary cache management table 300 stored in the table region 215 of the DRAM 211 and determines whether data that corresponds to the data to be written and is before an update exists on the auxiliary cache memory 222. Hereinafter, whether the data that corresponds to the data to be written and is before the update exists is merely described as whether the data to be written exists.

When the data does not exist on the auxiliary cache memory 222, the I/O manager 503 asynchronously writes the data written to the DRAM 211 to the disk 30.

On the other hand, when the data exists on the auxiliary cache memory 222, the I/O manager 503 asynchronously writes the acquired data to the auxiliary cache memory 222, thereby updating the corresponding data. Then, the I/O manager 503 outputs, to the table manager 504, an instruction to set a dirty flag of the data written to the auxiliary cache memory 222 to ON. After that, the I/O manager 503 asynchronously writes the data written to the auxiliary cache memory 222 to the disk 30 and updates the data of the disk 30. Then, the I/O manager 503 outputs, to the table manager 504, an instruction to set the dirty flag of the data written to the disk 30 to OFF. However, upon further receiving a command to write specific data in a state in which a dirty flag of the specific data in the auxiliary cache management table 300 indicates ON, the I/O manager 503 does not output an instruction to set the dirty flag to OFF until the I/O manager 503 writes data indicated in a subsequent write command to the disk 30.

Next, operations of the I/O manager 503 when the disk I/O is the write command in a state in which the notification indicating the occurrence of the failure is received from the failure detector 501 are described. When the failure detector 501 detects the failure, the I/O manager 503 receives, from the access stop unit 502, an instruction to stop migration of data between the auxiliary cache memory 222 and the disk 30. Then, the I/O manager 503 stops access between the auxiliary cache memory 222 and the disk 30. For example, the I/O manager 503 stops write-back from the auxiliary cache memory 222 to the disk 30.

Next, the I/O manager 503 determines whether data written to the DRAM 211 in accordance with a write command before the occurrence of the failure exists and whether dirty data that is not completely written back to the auxiliary cache memory 222 or the disk 30 exists. When the dirty data exists, the I/O manager 503 writes the dirty data existing on the DRAM 211 back to the disk 30. For example, the I/O manager 503 selects any of dirty data items existing on the DRAM 211 as a target to be written back, repeatedly executes the following processes on the selected data item, and executes the following processes on all the dirty data items on the DRAM 211.

The I/O manager 503 determines whether selected data is already registered in the auxiliary cache management table 300. When the selected data is not registered in the auxiliary cache management table 300, the I/O manager 503 writes the selected data to the disk 30 and updates data of the disk 30.

On the other hand, when the selected data is already registered in the auxiliary cache management table 300, the I/O manager 503 references a dirty flag of the auxiliary cache management table 300 and determines whether the data is dirty data existing on the auxiliary cache memory 222. When the selected data is not the dirty data existing on the auxiliary cache memory 222, the I/O manager 503 initializes an element included in the auxiliary cache management table 300 and indicating the data and deletes registered information of the element. After that, the I/O manager 503 writes the selected data to the disk 30 and updates the data of the disk 30. The data that is already registered in the auxiliary cache management table 300 and is not dirty data existing on the auxiliary cache memory 222 is an example of "reflected first data".

Then, the I/O manager 503 sets a final storage region for the data to the disk 30. After that, upon receiving a command to write the data, the I/O manager 503 operates in the write-through mode in which the disk 30 is used as the final storage medium. For example, the I/O manager 503 writes the write data to the DRAM 211 and the disk 30 and transmits a response indicating the completion of the writing after the completion of the writing to the disk 30. In this case, when the failure occurs, a dirty flag indicated in the element included the auxiliary cache management table 300 and indicating the selected data indicates OFF, and data of a 0x800 region managed by the element matches data of a corresponding 0x800 region included in the disk 30. Therefore, even when the element included in the auxiliary cache management table 300 and indicating the selected data is initialized, an access destination is changed from the auxiliary cache memory 222 to the disk 30, but a problem of data consistency does not occur.

On the other hand, when the selected data is the dirty data existing on the auxiliary cache memory 222, the I/O manager 503 writes the selected data to the auxiliary cache memory 222 and updates the data of the auxiliary cache memory 222. The data that is already registered in the auxiliary cache management table 300 and is the dirty data existing on the auxiliary cache memory 222 is an example of "first data before reflection".

After that, the I/O manager 503 sets the final storage region for the data to the auxiliary cache memory 222. After that, upon receiving a command to write the data after the occurrence of the failure, the I/O manager 503 writes the data to the auxiliary cache memory 222 in a write-through process. For example, the I/O manager 503 writes the write data to the DRAM 211 and the auxiliary cache memory 222 and transmits a response indicating the completion of the writing after the completion of the writing to the auxiliary cache memory 222. In this case, a dirty flag included in the auxiliary cache management table 300 and provided for the selected data indicates ON when the failure occurs. Even when the data is written to the auxiliary cache memory 222 after that, the dirty flag is maintained to indicate ON. Therefore, during the time when the dirty flag indicates ON, the I/O manager 503 does not output an instruction to update the dirty flag to the table manager 504.

When the I/O manager 503 is instructed to write data not existing on the auxiliary cache management table 300 at the time of the occurrence of the failure in accordance with a write command after the occurrence of the failure, the I/O manager 503 operates in the write-through mode in which the final storage medium for the data is the disk 30. For example, the I/O manager 503 writes the write data to the DRAM 211 and the disk 30 and transmits a response indicating the completion of the writing after the completion of the writing to the disk 30.

The data instructed to be written in accordance with the write command after the occurrence of the failure is an example of "second data". Determining a writing destination of the data instructed to be written in accordance with the write command after the occurrence of the failure based on the dirty flag is an example of a process of selecting a writing destination based on a storage state of data.

When the storage device 10 is restored to a normal state without a power outage in a state in which a failure is detected by the failure detector 501, the I/O manager 503 uses the auxiliary cache management table 300 on the DRAM 211 to execute a write-back process in the normal state. In this case, the I/O manager 503 may discard the auxiliary cache management table 300 on the auxiliary cache memory 222.

Next, operations of the I/O manager 503 when a power outage occurs and power is restored in a state in which a failure is detected by the failure detector 501 are described. The I/O manager 503 acquires the auxiliary cache management table 300 stored in the metadata region of the auxiliary cache memory 222. Then, the I/O manager 503 searches for each of the elements of the auxiliary cache management table 300 and extracts an element having a dirty flag indicating ON. Then, the I/O manager 503 requests the table manager 504 to copy the element having the dirty flag indicating ON to the auxiliary cache management table 300 on the DRAM 211.

After that, the I/O manager 503 receives a notification indicating the completion of the copy from the table manager 504. Then, the I/O manager 503 uses the auxiliary cache management table 300, which exists on the DRAM 211 and for which the copy has been completed, to execute the write-back process in the normal state. In this case, the I/O manager 503 may discard the auxiliary cache management table 300 on the auxiliary cache memory 222.

When data is not stored in the auxiliary cache memory 222 in a process of processing a read command, the table manager 504 receives, from the I/O manager 503, a request to update the auxiliary cache management table 300. Then, the table manager 504 registers information of data stored in the auxiliary cache memory 222 in the auxiliary cache management table 300 stored in the table region 215 of the DRAM 211. After that, the table manager 504 notifies the completion of the registration to the I/O manager 503.

When the table manager 504 receives a write command and data is written to the auxiliary cache memory 222, the table manager 504 receives, from the I/O manager 503, an instruction to set a dirty flag to ON. Then, the table manager 504 sets, to ON, the dirty flag indicated in an element on the auxiliary cache management table 300 having the data written to the auxiliary cache memory 222 and registered.

After that, when the data is written to the disk 30, the table manager 504 receives, from the I/O manager 503, an instruction to set the dirty flag to OFF. Then, the table manager 504 sets, to OFF, the dirty flag indicated in the element on the auxiliary cache management table 300 having the data written to the disk 30 and registered.

When the storage device 10 is restored to the normal state without a power outage in a state in which a failure is detected by the failure detector 501, the table manager 504 initializes all the elements of the auxiliary cache management table 300 stored in the table region 215 of the DRAM 211. After that, the table manager 504 receives, from the I/O manager 503, an instruction to copy an element, which is included in the auxiliary cache management table 300 stored in the auxiliary cache memory 222 and has a dirty flag indicating ON, to the auxiliary cache management table 300 on the DRAM 211. When the copying of the specified element to the auxiliary cache management table 300 stored in the table region 215 of the DRAM 211 is completed, the table manager 504 notifies the completion of the copying to the I/O manager 503.

Figure 6:
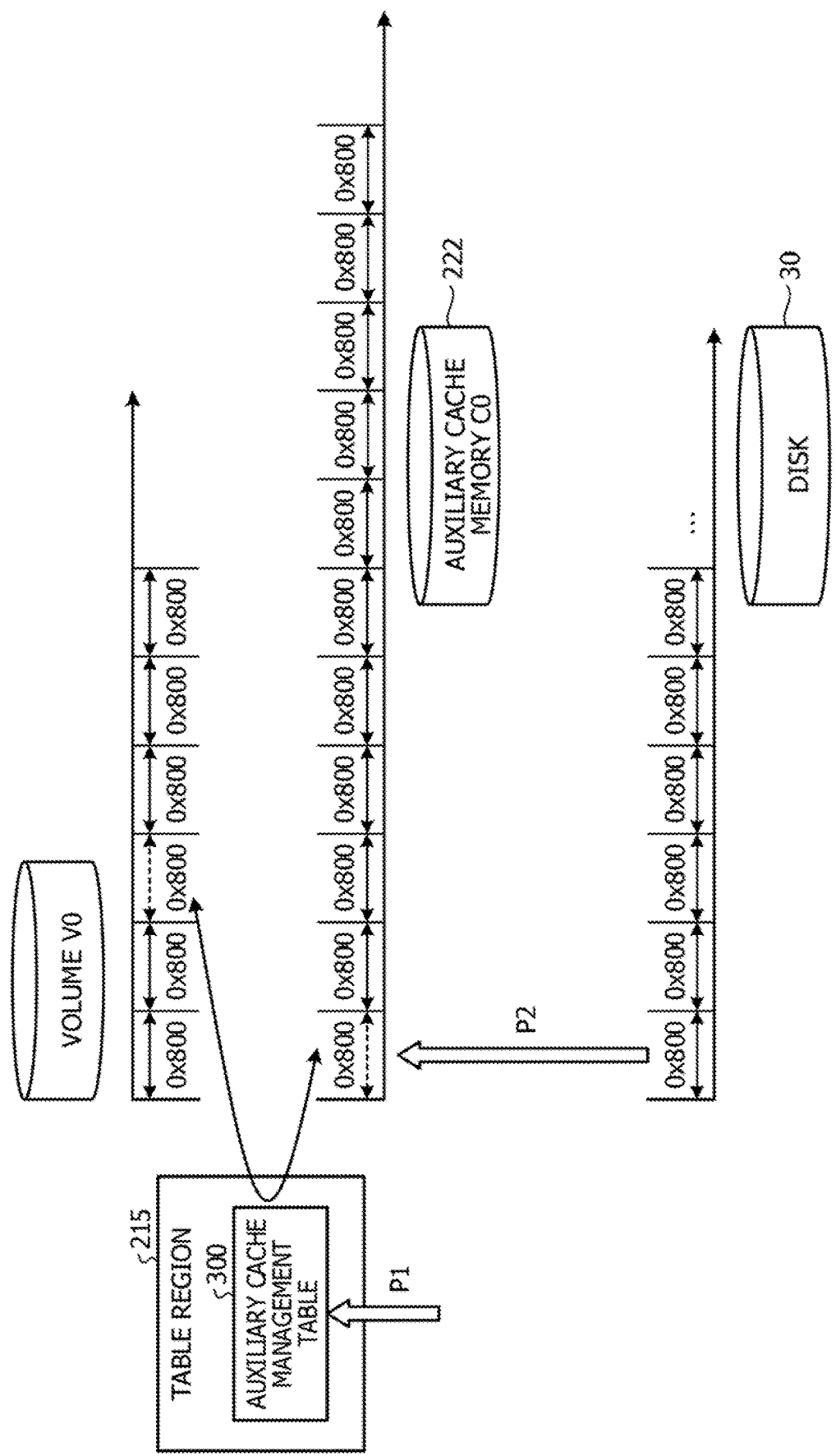
FIG. 6 is a diagram describing storage states of data in data reading.

Next, an overview of a process to be executed in data reading is described with reference to FIGS. 6 and 7. FIG. 6 is a diagram describing storage states of data in the data reading. FIG. 7 is a diagram illustrating an example of the auxiliary cache management table in the data reading.

When data does not exist on the DRAM 211 in the data reading, the I/O manager 503 confirms the auxiliary cache management table 300 and determines whether the data exists on the auxiliary cache memory 222. When the data does not exist on the auxiliary cache memory 222, the I/O manager 503 requests the table manager 504 to update the auxiliary cache management table 300. The table manager 504 executes an update process P1 of registering the data to be read in the auxiliary cache management table 300. In this case, as indicated by a frame 311 in FIG. 7, the table manager 504 registers 2 as the logical volume LBA offset of the volume V0 in the element #0 indicating the region of the auxiliary cache LBA offset 0 in the auxiliary cache memory C0. Therefore, the region of the logical volume LBA offset 2 of the volume V0 is associated with the region of the auxiliary cache LBA offset 0 of the auxiliary cache memory C0. After that, the I/O manager 503 receives the notification indicating the completion of the update, reads the data from the disk 30, and causes the data to be stored in the region of the auxiliary cache LBA offset 0 of the auxiliary cache memory C0. The I/O manager 503 causes the read data to be stored in the cache region 214 of the DRAM 211 and transmits the read data to the host 1.

Figure 8:
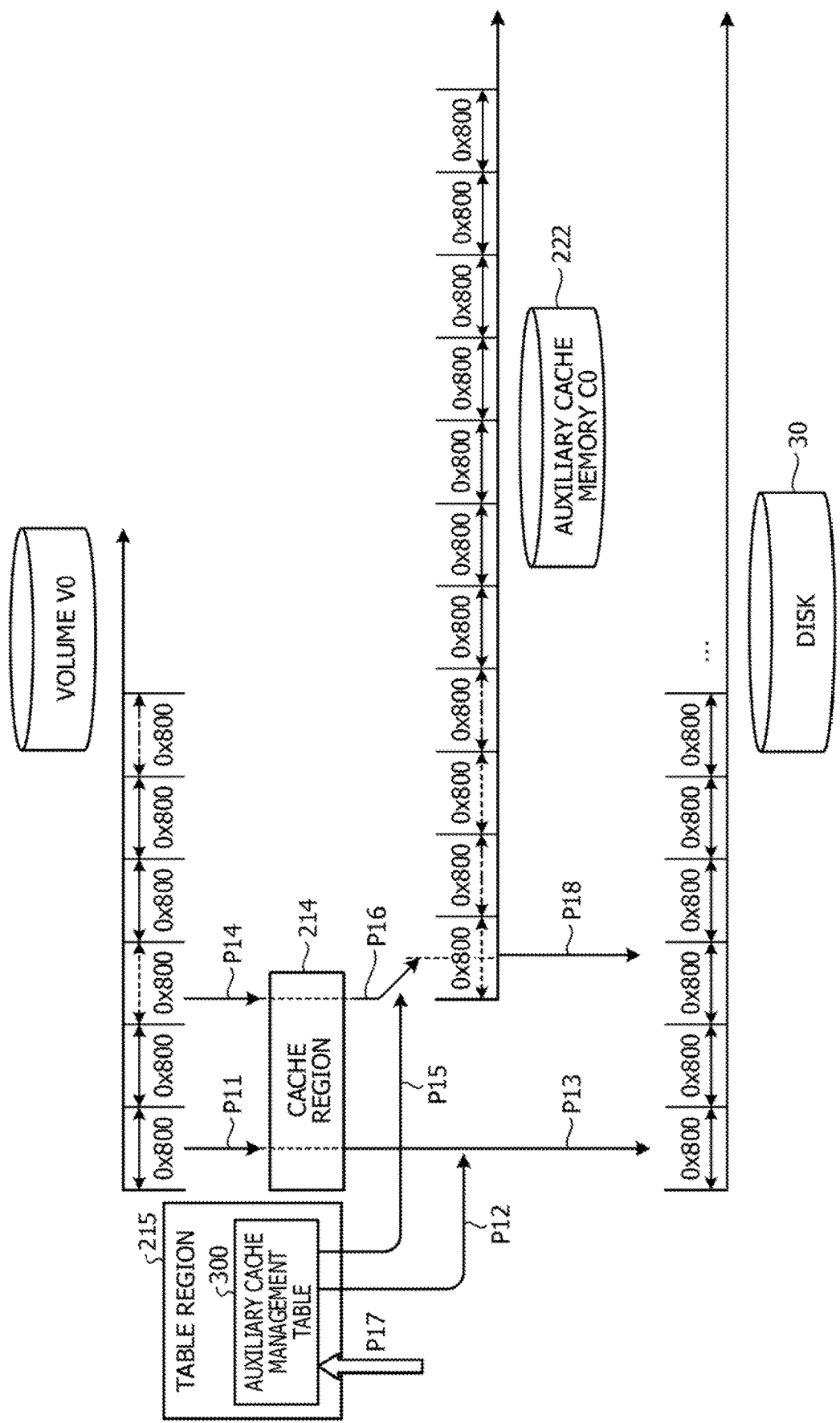
FIG. 8 is a diagram describing storage states of data in data writing a normal state.

Next, an overview of a process of writing data in the normal state is described with reference to FIGS. 8 and 9. FIG. 8 is a diagram describing storage states of data in the data writing in the normal state. FIG. 9 is a diagram illustrating an example of the auxiliary cache management table in the data writing in the normal state.

The case where write data does not exist in the auxiliary cache memory 222 is described below. The I/O manager 503 executes a process P11 of storing write data of the volume V0 in the cache region 214 on the DRAM 211. Next, the I/O manager 503 executes a process P12 of referencing the auxiliary cache management table 300 and determining whether the write data is already stored in the auxiliary cache memory 222. In this case, the write data is not stored in the auxiliary cache memory 222. Therefore, the I/O manager 503 executes a process P13 of asynchronously writing the write data stored in the cache region 214 to the disk 30.

Next, the case where the write data exists on the auxiliary cache memory 222 is described. The I/O manager 503 executes a process P14 of storing the write data of the volume V0 in the cache region 214 on the DRAM 211. Next, the I/O manager 503 executes a process P15 of referencing the auxiliary cache management table 300 and determining whether the write data is already stored in the auxiliary cache memory 222. In this case, the write data is stored in the auxiliary cache memory 222. Therefore, the I/O manager 503 executes a process P16 of asynchronously writing the write data stored in the cache region 214 to the auxiliary cache memory 222. In this case, the I/O manager 503 notifies an instruction to set a dirty flag of the write data to ON to the table manager 504. The table manager 504 receives the instruction and executes an update process P17 of setting the dirty flag of the write data to ON. Therefore, for example, when data at a position corresponding to the logical volume LBA offset 2 of the volume V0 is the write data, the dirty flag of the element #0 in which the write data has been registered is changed to ON, as indicated by a frame 312 in FIG. 9. After that, the I/O manager 503 executes a process P18 of asynchronously writing the write data stored in the auxiliary cache memory 222 to the disk 30.

Figure 10:
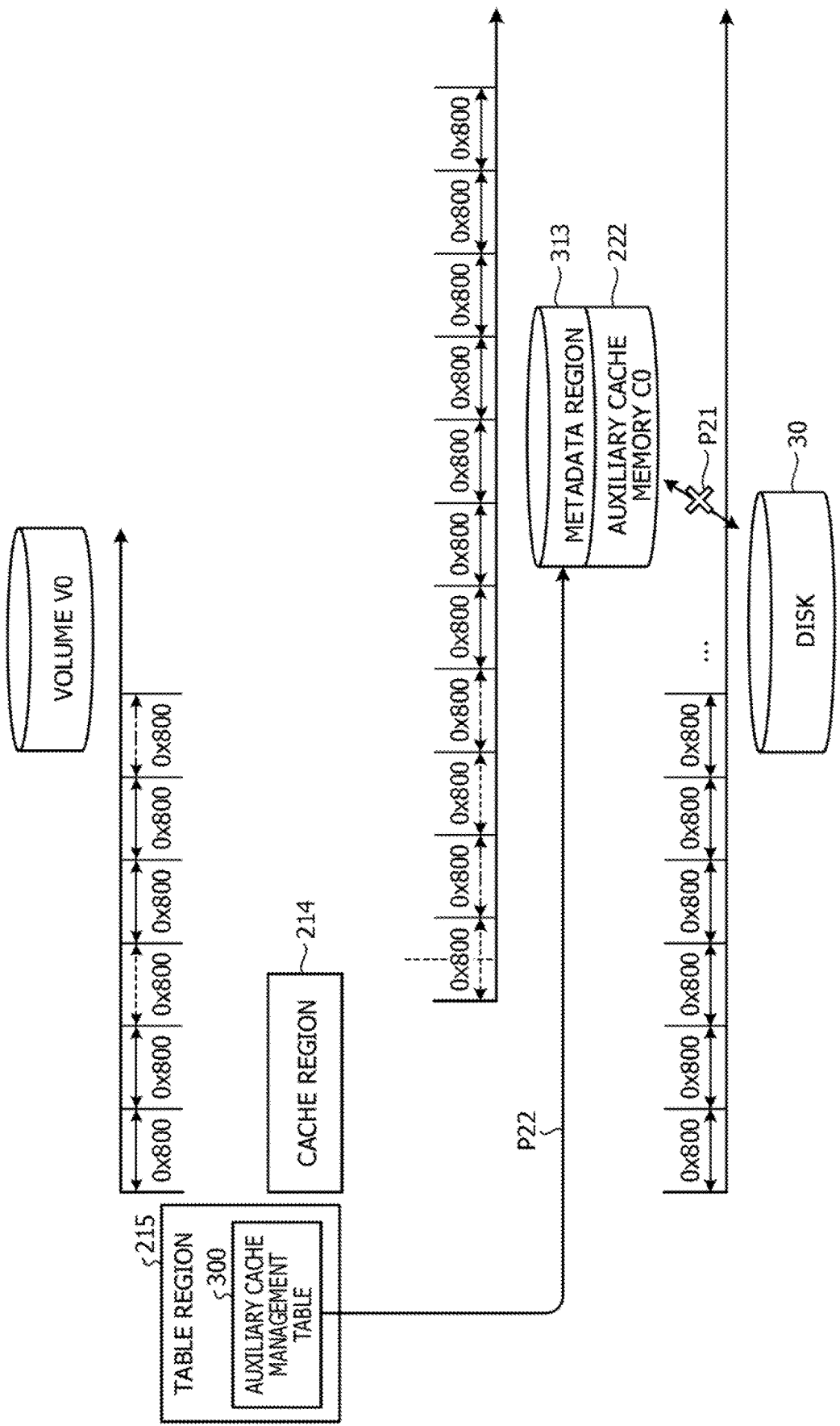
FIG. 10 is a diagram describing storage states of data when a failure occurs.

Next, an overview of a process to be executed when a failure occurs is described with reference to FIGS. 10 and 11. FIG. 10 is a diagram describing storage states of data when the failure occurs. FIG. 11 is a diagram illustrating an example of the auxiliary cache management table when the failure occurs.

When the failure is detected by the failure detector 501, the access stop unit 502 receives a notification indicating the occurrence of the failure and executes a process P21 of causing the I/O manager 503 to stop access between the auxiliary cache memory 222 and the disk 30. For example, the access stop unit 502 causes the I/O manager 503 to stop writing data stored in the auxiliary cache memory 222 to the disk 30.

Next, the table saving unit 505 receives the notification indicating the occurrence of the failure and secures a metadata region 313 in the auxiliary cache memory 222. Then, the table saving unit 505 executes a saving process P22 of copying the auxiliary cache management table 300 stored in the table region 215 of the DRAM 211 to the metadata region 313 of the auxiliary cache memory 222.

A table 314 illustrated in FIG. 11 indicates the auxiliary cache management table 300 stored in the table region 215. A table 315 indicates the auxiliary cache management table 300 saved in the metadata region 313. In this case, details registered in the table 314 match details registered in the table 315.

Figure 12:
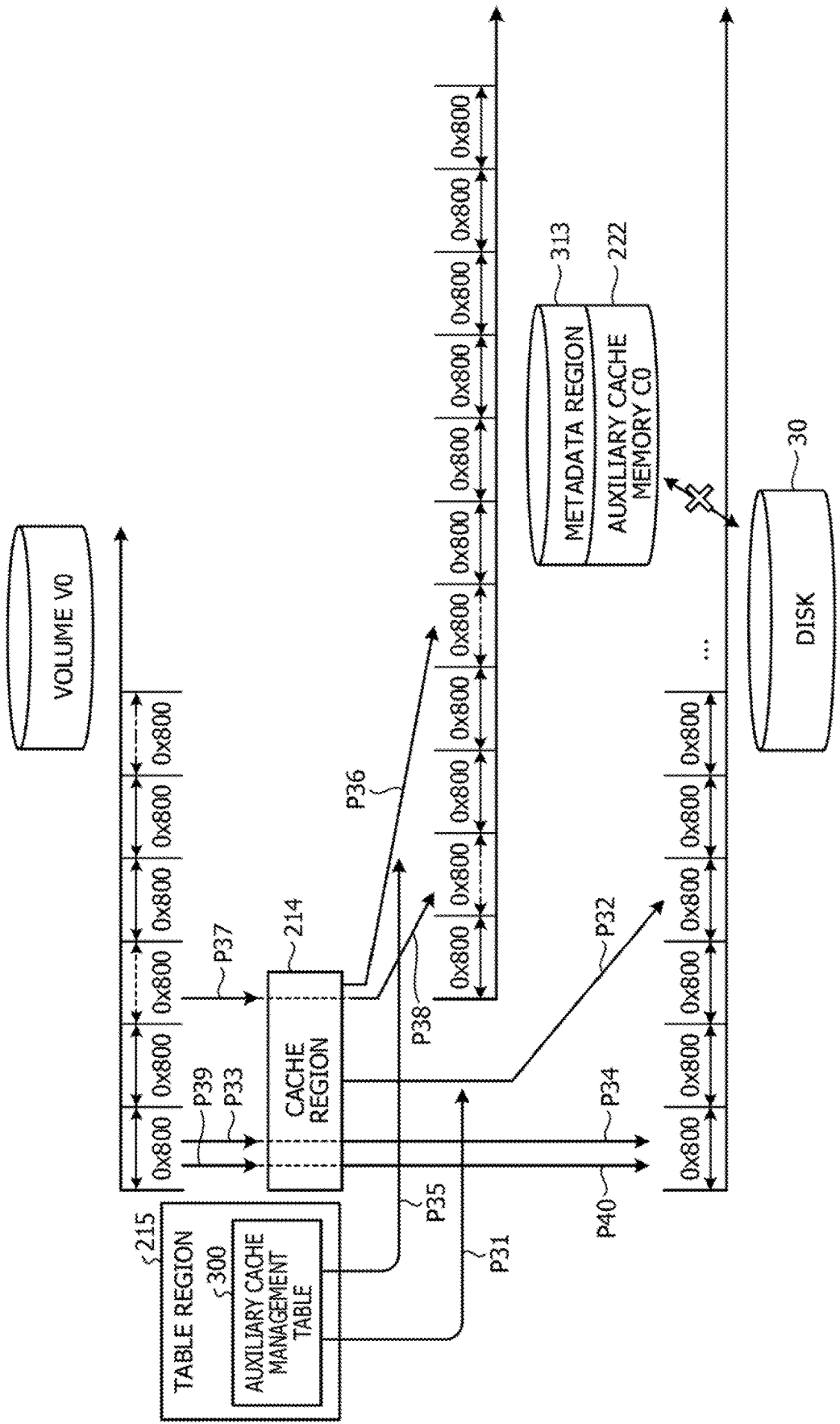
FIG. 12 is a diagram describing storage states of data in a process of writing data when a failure occurs.

Next, an overview of a process of writing data when a failure occurs is described with reference to FIGS. 12 and 13. FIG. 12 is a diagram describing storage states of data in the process of writing the data when the failure occurs. FIG. 13 is a diagram illustrating an example of the auxiliary cache management table in the case where the process of writing the data when the failure occurs is executed.

A case is described where data that is dirty data in the cache region 214 of the DRAM 211 and registered in the auxiliary cache management table 300 and exists on the auxiliary cache memory 222 matches data that is dirty data in the cache region 214 of the DRAM 211 and registered in the auxiliary cache management table 300 and exists on the disk 30. The I/O manager 503 executes a process P31 of referencing the auxiliary cache management table 300 and determining whether selected data is dirty data of the auxiliary cache management table 300. In this case, the I/O manager 503 determines that the selected data is not the dirty data, and the I/O manager 503 initializes a corresponding element of the auxiliary cache management table 300 stored in the cache region 214 of the DRAM 211.

A table 316 illustrated in FIG. 13 indicates the auxiliary cache management table 300 stored in the table region 215, and a table 317 indicates the auxiliary cache management table 300 saved in the metadata region 313 of the auxiliary cache memory 222. In this case, for example, since dirty flags of data of logical volume LBA offsets 2 and 3 of the volume V0 indicate OFF, the elements #0 and #3 of the table 316 on the cache region 214 of the DRAM 211 are initialized, as indicated by frames 318 and 319.

After that, the I/O manager 503 executes a write-back process P32 of writing the selected data back to the disk 30. Then, the I/O manager 503 sets a final storage medium for the selected data to the disk 30. After that, upon receiving a command to write the data, the I/O manager 503 executes a process P33 of writing the data to the cache region 214 and executes a write-through process P34 of writing the data to the disk 30.

Next, a case is described where data that is dirty data existing in the cache region 214 of the DRAM 211 and registered in the auxiliary cache management table 300 and exists on the auxiliary cache memory 222 does not match data that is dirty data existing on the cache region 214 of the DRAM 211 and registered in the auxiliary cache management table 300 and exists on the disk 30. The I/O manager 503 executes a process P35 of referencing the auxiliary cache management table 300 and determining whether selected data is dirty data of the auxiliary cache management table 300. In this case, since the selected data is the dirty data, the I/O manager 503 executes a write-back process P36 of writing the selected data back to the auxiliary cache memory 222. Then, the I/O manager 503 sets the final storage medium for the selected data to the auxiliary cache memory 222. After that, upon receiving a command to write the data, the I/O manager 503 executes a process P37 of writing the data to the cache region 214 and executes a write-through process P38 of writing the data to the auxiliary cache memory 222. In this case, as illustrated in FIG. 13, a state is maintained in which details registered in the element #1 indicated in a frame 320 and having the dirty flag indicating ON in the tables 316 and 317 match details registered in the element #4 indicated in a frame 321 and having the dirty flag indicating ON in the tables 316 and 317.

On the other hand, upon receiving a command to write data that is not dirty data in the cache region 214 of the DRAM 211, the I/O manager 503 executes a process P39 of writing the data to the cache region 214 and executes a write-through process P40 of writing the data to the disk 30.

Figure 14:
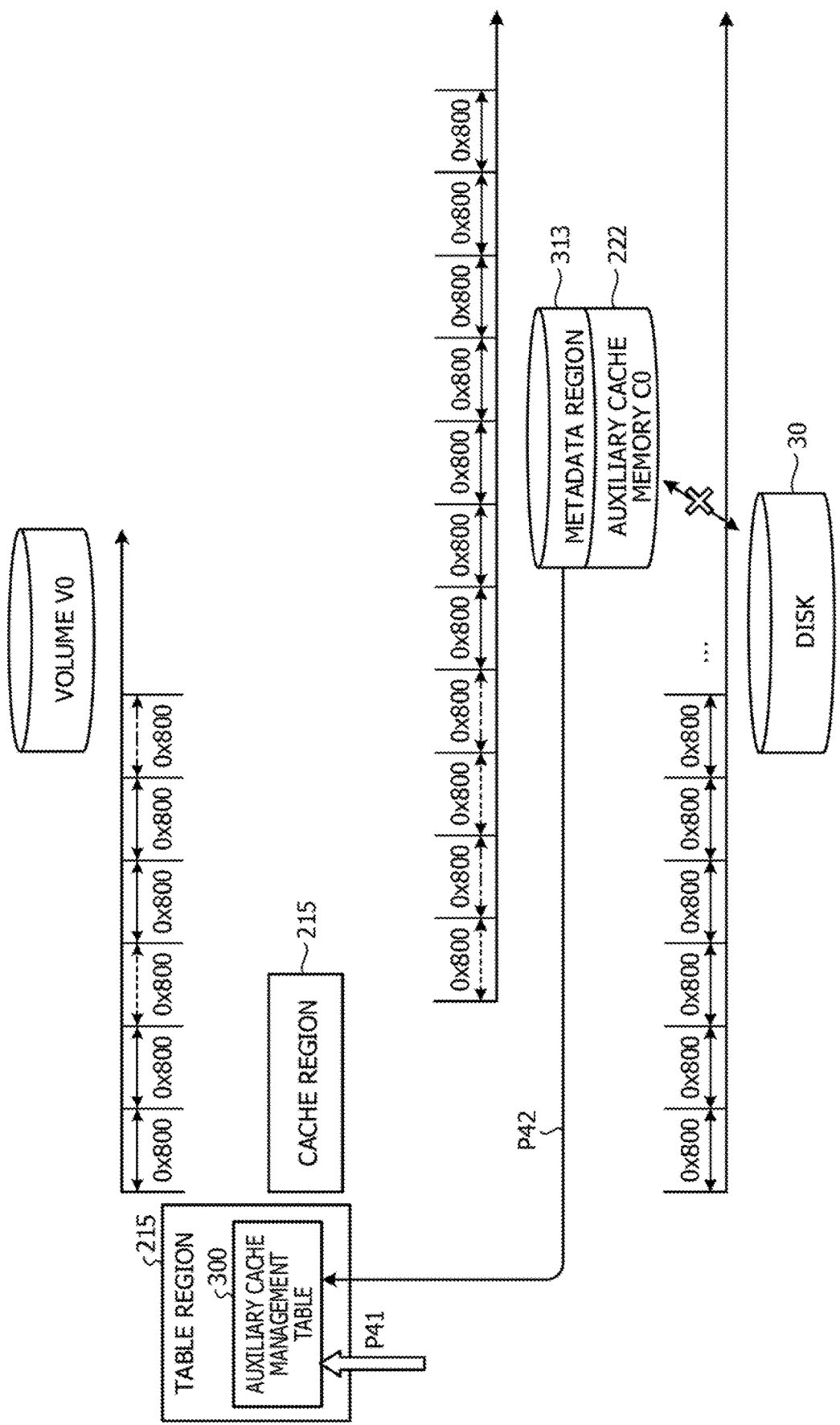
FIG. 14 is a diagram describing storage states of data in a process executed at the time of power restoration in the case where a power outage occurs after the occurrence of a failure.

Next, an overview of a process to be executed at the time of power restoration in the case where a power outage occurs after the occurrence of a failure is described with reference to FIGS. 14 and 15. FIG. 14 is a diagram describing storage states of data in the process executed at the time of power restoration in the case where a power outage occurs after the occurrence of a failure, FIG. 15 is a diagram illustrating an example of the auxiliary cache management table when the process is executed at the time of the power restoration in the case where the power outage occurs after the occurrence of the failure.

First, the table manager 504 executes a process P41 of initializing all the elements of the auxiliary cache management table 300 stored in the table region 215 of the DRAM 211. Next, the I/O manager 503 executes a process P42 of restoring registered information to the auxiliary cache management table 300 of the table region 215 in a state in which access between the auxiliary cache memory 222 and the disk 30 is stopped. For example, the I/O manager 503 restores the information of the auxiliary cache management table 300 of the metadata region 313 to the auxiliary cache management table 300 of the table region 215. In this case, the I/O manager 503 copies the information indicated in an element that is among the elements of the auxiliary cache management table 300 of the metadata region 313 and has a dirty flag indicating ON to the auxiliary cache management table 300 of the table region 215. After that, the I/O manager 503 operates in the write-back mode in the normal state.

A table 322 illustrated in FIG. 15 indicates the auxiliary cache management table 300 stored in the table region 215 when power is restored. A table 323 indicates the auxiliary cache management table 300 saved in the metadata region 313 of the auxiliary cache memory 222 when the power is restored. In this case, first, all elements of the table 322 are initialized by the table manager 504. Then, information indicated in frames 324 and 325 is registered in the elements #1 and #4 by copying the elements included in the table 323 and having dirty flags indicating ON to the table 322.

Figure 16:
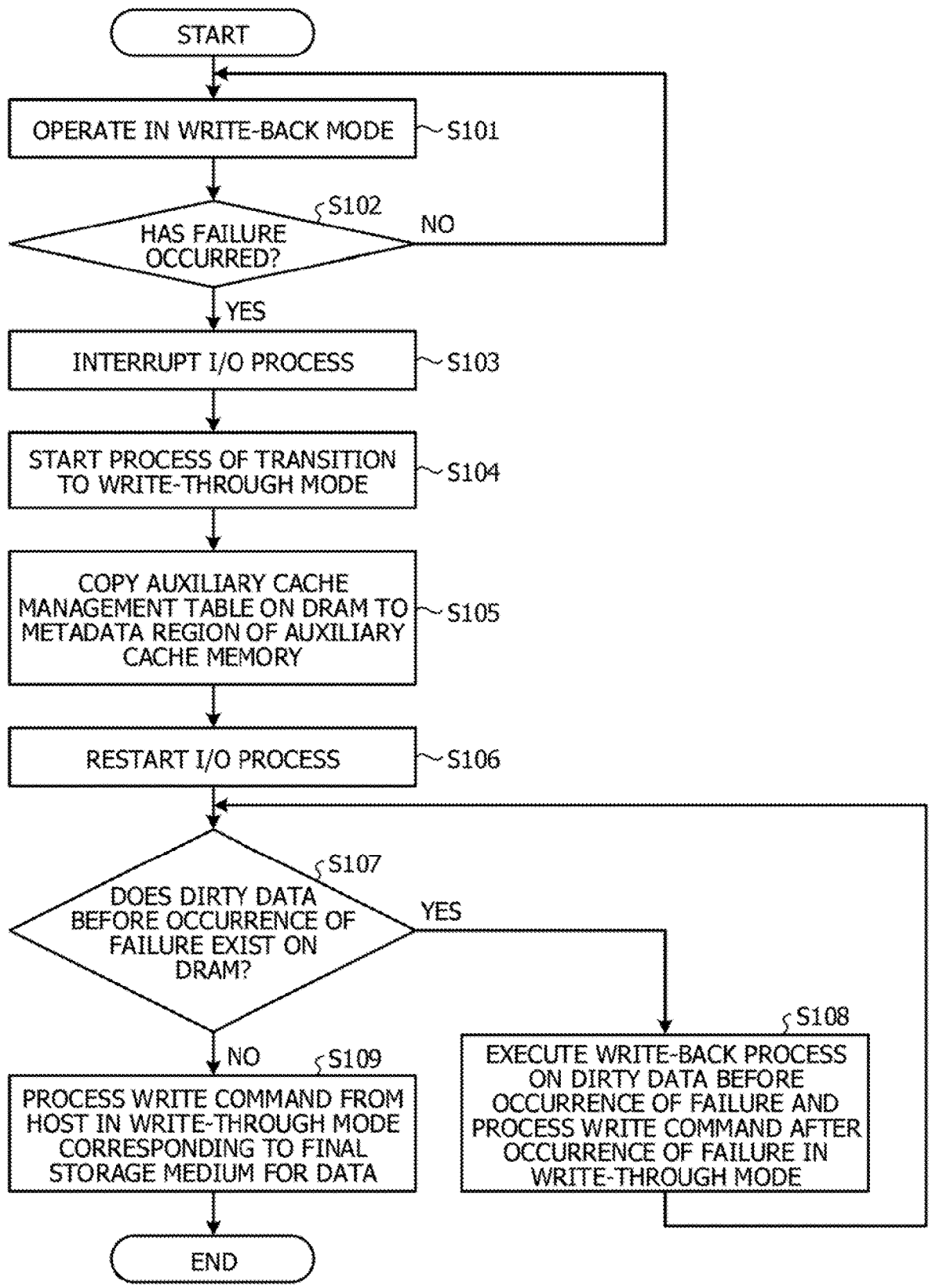
FIG. 16 is a flowchart of a process of transition from a write-back mode to a write-through mode when a failure occurs.

Next, the flow of a process of transition from the write-back mode to the write-through mode when a failure occurs is described with reference to FIG. 16. FIG. 16 is a flowchart of the process of the transition from the write-back mode to the write-through mode when a failure occurs.

The cache controller 252 operates in the write-back mode (in step S101).

The failure detector 102 determines whether a failure that causes an RAS event that may impair the safety of data existing on the DRAM 211, which is a volatile memory, has occurred (in step S102). When the failure has not occurred (No in step S102), the process returns to step S101.

On the other hand, when the failure detector 501 detects that the failure has occurred (Yes in step S102), the failure detector 501 notifies the occurrence of the failure to the access stop unit 502 and the I/O manager 503. The I/O manager 503 receives the notification indicating the occurrence of the failure and interrupts an I/O process (in step S103).

Then, the I/O manager 503 starts a process of the transition to the write-through mode (in step S104).

The table saving unit 505 copies the auxiliary cache management table 300 stored in the table region 215 of the DRAM 211 to the metadata region of the auxiliary cache memory 222 (in step S105).

After that, the I/O manager 503 restarts the I/O process (in step S106).

The I/O manager 503 determines whether dirty data before the occurrence of the failure exists on the cache region 214 of the DRAM 211 (in step S107). When the dirty data before the occurrence of the failure exists (Yes in step S107), the I/O manager 503 processes a write command after the occurrence of the failure in the write-through mode in parallel with the execution of the write-back process of writing the dirty data before the occurrence of the failure (in step S108). Then, the I/O manager 503 causes the process to return to step S107.

On the other hand, when the dirty data before the occurrence of the failure does not exist (No in step S107), the I/O manager 503 processes a write command from the host 1 in the write-through mode corresponding to a final storage medium for data (in step S109).

Figure 17:
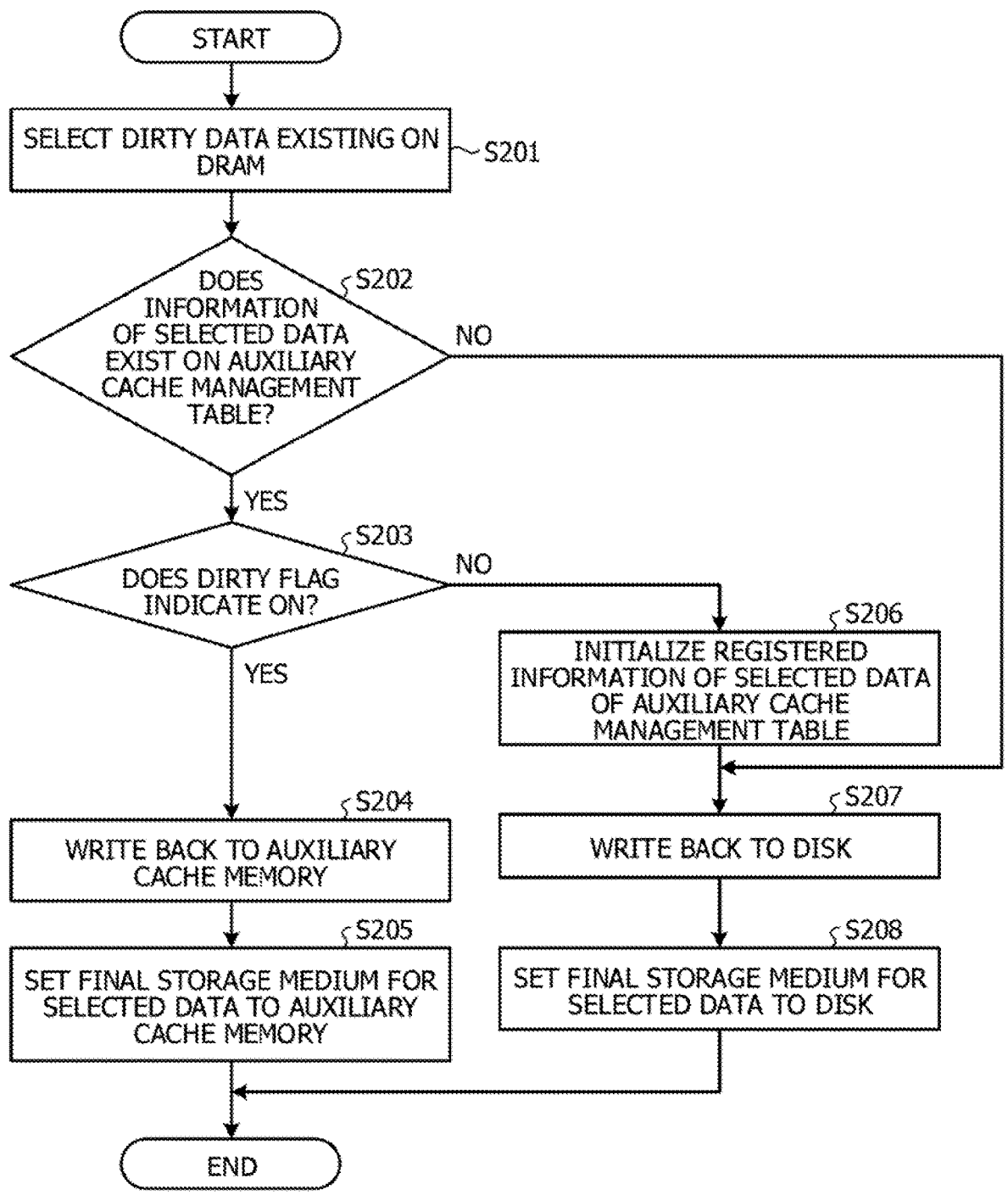
FIG. 17 is a flowchart of a write-back process to be executed when a failure occurs.

Next, the flow of the write-back process to be executed when a failure occurs is described with reference to FIG. 17. FIG. 17 is a flowchart of the write-back process to be executed when the failure occurs.

The I/O manager 503 selects, as a target to be written back, dirty data existing in the cache region 214 of the DRAM 211 (in step S201).

Next, the I/O manager 503 determines whether information of the selected data exists on the auxiliary cache management table 300 (in step S202). When the information of the selected data does not exist on the auxiliary cache management table 300 (No in step S202), the I/O manager 503 causes the process to proceed to step S207.

On the other hand, when the information of the selected data exists on the auxiliary cache management table 300 (Yes in step S202), the I/O manager 503 determines whether a dirty flag of the selected data indicates ON (in step S203).

When the dirty flag indicates ON (Yes in step S203), the I/O manager 503 writes the selected data back to the auxiliary cache memory 222 (in step S204).

After that, the I/O manager 503 sets a final storage medium for the selected data to the auxiliary cache memory 222 (in step S205).

On the other hand, when the dirty flag indicates OFF (No in step S203), the I/O manager 503 instructs the table manager 504 to reset registered information of the selected data. The table manager 504 receives the instruction from the I/O manager 503 and initializes the registered information related to the selected data and existing on the auxiliary cache management table 300 stored in the auxiliary cache memory 222 (in step S206).

The I/O manager 503 writes the selected data back to the disk 30 (in step S207).

After that, the I/O manager 503 sets the final storage medium for the selected data to the disk 30 (in step S208).

Figure 18:
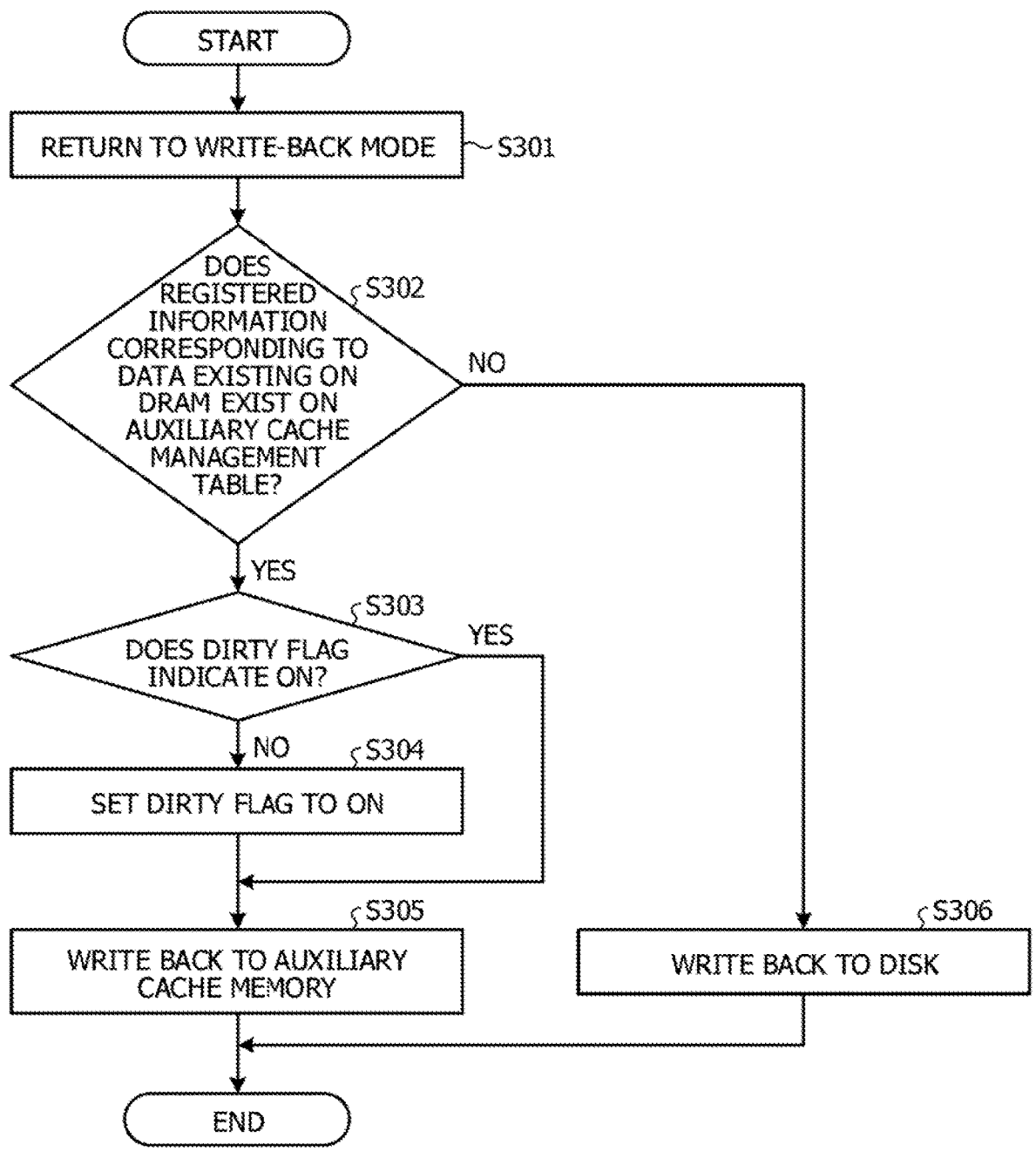
FIG. 18 is a flowchart of a process to be executed after a failure restored without a power outage after the occurrence of the failure.

Next, the flow of a process to be executed after a failure is restored without a power outage after the occurrence of the failure is described with reference to FIG. 18. FIG. 18 is a flowchart of the process to be executed after a failure is restored without a power outage after the occurrence of the failure.

The cache controller 252 returns to the write-back mode when the failure is handled and the state is restored to the normal state (in step S301).

The I/O manager 503 receives, from the communication unit 251, input of a command to write data. Then, the I/O manager 503 causes the write data to be stored in the cache region 214 of the DRAM 211 and transmits a response indicating the completion of the storage to the communication unit 251. After that, the I/O manager 503 determines whether registered information corresponding to the write data existing on the cache region 214 of the DRAM 211 exists on the auxiliary cache management table 300 stored in the table region 215 (in step S302).

When the registered information exists on the auxiliary cache management table 300 (Yes in step S302), the I/O manager 503 determines whether a dirty flag of the write data in the auxiliary cache management table 300 indicates ON (in step S303). When the dirty flag indicates OFF (No in step S303), the I/O manager 503 outputs an instruction to set the dirty flag to ON to the table manager 504. The table manager 504 receives the instruction from the I/O manager 503 and sets the dirty flag of the write data in the auxiliary cache management table 300 to ON (in step S304). When the dirty flag indicates ON (Yes in step S303), the table manager 504 causes the process to proceed to step S305 without updating the dirty flag.

Then, the I/O manager 503 writes the write data back to the auxiliary cache memory 222 (in step S305). After that, the write data stored in the auxiliary cache memory 222 is asynchronously written by the I/O manager 503 back to the disk 30.

On the other hand, when the registered information does not exist in the auxiliary cache management table 300 (No in step S302), the I/O manager 503 asynchronously writes the write data back to the disk 30 (in step S306).

The processes executed in steps S302 to S306 are the same as those executed by the cache controller 252 in the normal state.

Figure 19:
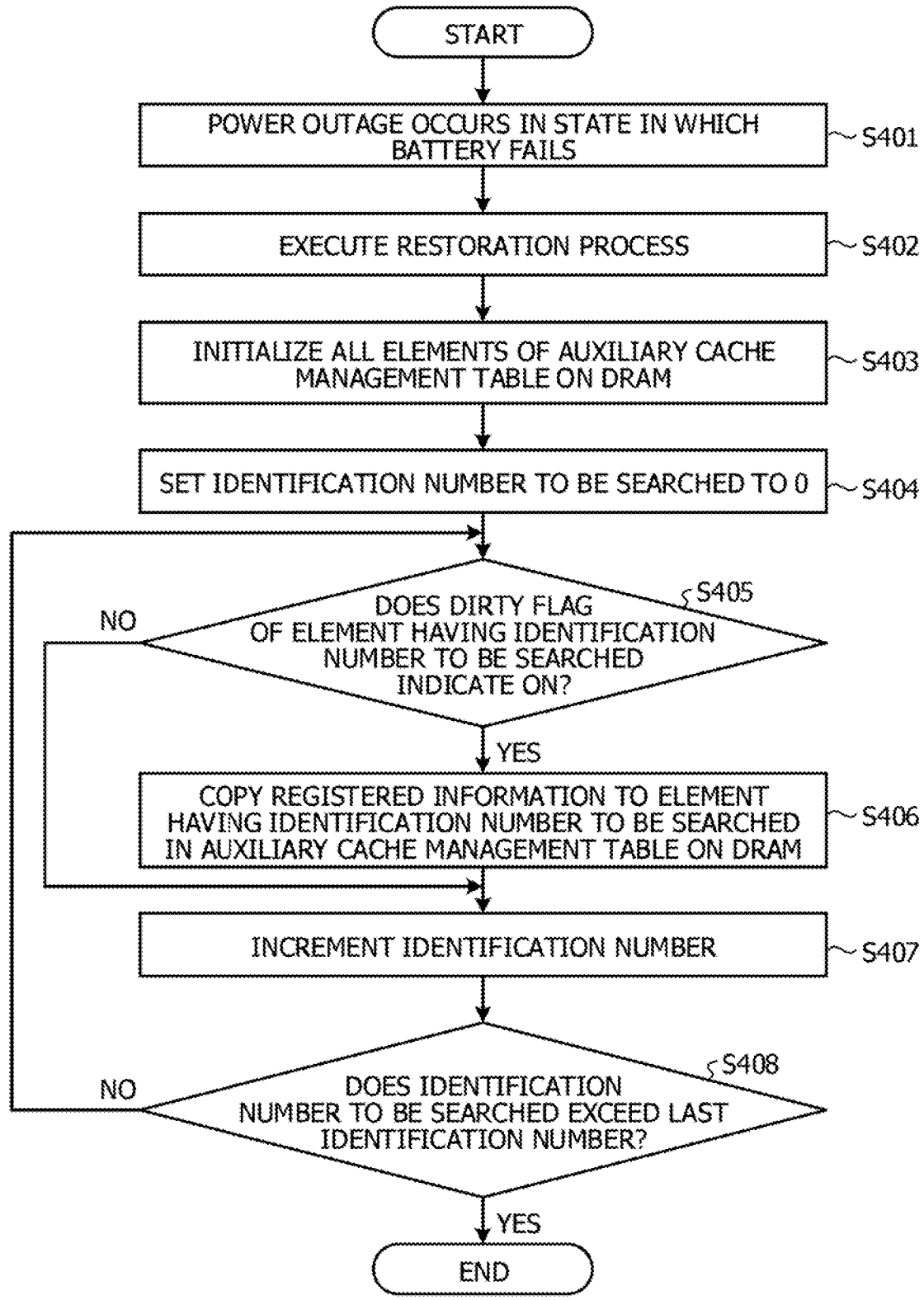
FIG. 19 is a flowchart of a process of restoring the auxiliary cache management table when power is restored after a power outage occurs in a state in which a failure occurs.

Next, the flow of a process of restoring the auxiliary cache management table 300 when power is restored after a power outage occurs in a state in which a failure occurs is described with reference to FIG. 19. FIG. 19 is a flowchart of a process of restoring the auxiliary cache management table when power is restored after a power outage occurs in a state in which a failure occurs. The case where the battery 23 fails and a failure that causes an RAS event occurs is described below. The case where continuous identification numbers #0, #1, . . . are assigned to the elements of the auxiliary cache management table 300 is described below.

A power outage occurs in a state in which the battery 23 fails (in step S401).

Power restoration and a process of restoring the failure of the battery 23 of the storage device 10 by an operator are performed (in step S402).

Power is supplied to the storage device 10 by the operator, and the storage device 10 executes a power-on process. In this case, the table manager 504 initializes all the elements of the auxiliary cache management table 300 stored in the table region 215 of the DRAM 211 (in step S403).

Next, the I/O manager 503 sets, to #0, an identification number, to be searched, of an element in the auxiliary cache management table 300 stored in the metadata region of the auxiliary cache memory 222 (in step S404).

Next, the I/O manager 503 determines whether a dirty flag of the element having the identification number to be searched indicates ON (in step S405).

When the dirty flag indicates ON (Yes in step S405), the I/O manager 503 requests the table manager 504 to restore registered information of the element having the identification number to be searched. The table manager 504 acquires the registered information of the element having the identification number to be searched in the auxiliary cache management table 300 stored in the metadata region of the auxiliary cache memory 222. Then, the table manager 504 copies the acquired registered information to the element having the identification number to be searched in the auxiliary cache management table 300 on the table region 215 of the DRAM 211 (in step S406). After that, the I/O manager 503 causes the process to proceed to step S407.

On the other hand, when the dirty flag indicates OFF (No in step S405), the I/O manager 503 causes the process to proceed to step S407 without restoring the registered information of the element having the identification number to be searched.

The I/O manager 503 increments the identification number by 1 (in step S407).

Then, the I/O manager 503 determines whether the identification number to be searched exceeds the last identification number of the auxiliary cache management table 300 (in step S408). When the identification number to be searched is equal to or smaller than the last identification number (No in step S408), the I/O manager 503 causes the process to proceed to step S405.

On the other hand, when the identification number to be searched exceeds the last identification number (Yes in step S408), the I/O manager 503 terminates the process of restoring the auxiliary cache management table 300.

As described above, when an RAS event that may impair the safety of data existing on the DRAM, which is the volatile memory, occurs, the storage control device according to the embodiment stops access between the auxiliary cache memory and the disk. The storage control device according to the embodiment saves, in the auxiliary cache memory, the auxiliary cache management table stored in the DRAM.

Since the access between the auxiliary cache memory and the disk is stopped, the write-back from the auxiliary cache to the disk is not executed and consistency between information of the auxiliary cache management table and data existing on the auxiliary cache memory is maintained. Therefore, even when a power outage occurs and data existing on the DRAM is lost, the management of data existing on the auxiliary cache memory may be continued after power restoration, and the safety of the storage device may be secured. For example, while the processing performance of the storage device is improved using the auxiliary cache memory, the reliability of the storage device may be improved.

By migrating the auxiliary cache management table to the auxiliary cache memory, actual data and the management table may be collectively managed and the consistency of data may be more reliably secured.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device comprising:
an auxiliary cache memory that is a nonvolatile memory;
a volatile memory; and
a processor configured to:
execute a writing control process that including
receiving a first command to write first data to a storage medium with a lower processing speed than the auxiliary cache memory and a larger capacity than the auxiliary cache memory,
writing the first data to the volatile memory,
transmitting a response indicating the completion of the writing,
writing the first data stored in the volatile memory to the auxiliary cache memory after the transmission of the response, and
writing the first data stored in the auxiliary cache memory to the storage medium;
execute an information management process that includes storing management information in the volatile memory, the management information including state information indicating storage states of data in the auxiliary cache memory and in the storage medium; and
execute a saving control process after a predetermined failure occurs, the saving control process being configured to
cause the writing control process to stop control of writing the data stored in the auxiliary cache memory to the storage medium,
secure, in the auxiliary cache memory, a storage region for storing the management information of the volatile memory,
generate a copy of the management information of the volatile memory in the storage region, and
cause the writing control process to execute control to write the first data stored in the volatile memory to the auxiliary cache memory or the storage medium based on the management information of the auxiliary cache memory.

2. The storage control device according to claim 1, wherein
the writing controller is configured to,
after the predetermined failure occurs,
receive a second command to write second data to the storage medium,
write the second data to the volatile memory,
select either the auxiliary cache memory or the storage medium based on the storage state of the data of the auxiliary cache memory,
write the second data stored in the volatile memory to the selected auxiliary cache memory or the selected storage medium, and
transmit a response indicating the completion of the writing.

3. The storage control device according to claim 2, wherein
when first update data exists at a time the predetermined failure occurs, the writing control process is configured to use the first update data to update the first data before the reflection, the first data before the reflection being data that has been stored in the auxiliary cache memory and that has not yet been stored in the storage medium, the first update data being data that corresponds to the first data before the reflection and that has been stored in the volatile memory and that has not been stored in the auxiliary cache memory.

4. The storage control device according to claim 3, wherein
when the received second command is a command to update the first data before the reflection, the writing control process is configured to
select the auxiliary cache memory, and
write the second data stored in the volatile memory to the selected auxiliary cache memory.

5. The storage control device according claim 2, wherein
when second update data exists at a time the predetermined failure occurs, the writing control process is configured to delete information of the reflected first data included in the management information and use the second update data to update the reflected first data stored in the storage medium, the reflected first data being data that has been stored in both of the auxiliary cache memory and the storage medium, the second update data that corresponds to the reflected first data and that has been stored in the volatile memory and that has not yet been stored in the auxiliary cache memory.

6. The storage control device according to claim 5, wherein
when the received second command is a command to update the reflected first data, the writing control process is configured to
select the storage medium, and
write the second data stored in the volatile memory to the selected storage medium.

7. The storage control device according to claim 1, wherein
when the predetermined failure occurs, the writing control process is configured to
reference the management information, and
acquire writing states of the first data in the auxiliary cache memory and the storage medium based on the state information.

8. A non-transitory computer-readable storage medium for storing a storage control program for controlling a storage device, the storage device including an auxiliary cache memory, a volatile memory, and storage medium, the auxiliary cache memory being a nonvolatile memory, the storage medium being a medium with a lower processing speed than the auxiliary cache memory and a larger capacity than the auxiliary cache memory, the storage control program being configured to cause a processor to execute a process, the process comprising:

executing a writing control process configured to
receive a command to write first data to the storage medium,
write the first data to the volatile memory,
transmit a response indicating the completion of the writing,
write the first data stored in the volatile memory to the auxiliary cache memory after the transmission of the response, and
write the first data stored in the auxiliary cache memory to the storage medium;

executing an information management process configured to store, in the volatile memory, management information having registered state information indicating storage states of data in the auxiliary cache memory and the storage medium;

executing a saving control process after a predetermined failure occurs, the saving control process being configured to
stop control of the writing of the data stored in the auxiliary cache memory to the storage medium,
secure, in the auxiliary cache memory, a storage region for storing the management information of the volatile memory,
generate a copy of the management information of the volatile memory in the storage region, and
write the first data stored in the volatile memory to the auxiliary cache memory or the storage medium based on the management information of the auxiliary cache memory.

* * * * *